United States Patent
Tang et al.

(10) Patent No.: US 10,798,729 B2
(45) Date of Patent: Oct. 6, 2020

(54) DATA TRANSMISSION METHOD AND APPARATUS

(71) Applicant: HUAWEI TECHNOLOGIES CO., LTD., Shenzhen, Guangdong (CN)

(72) Inventors: Xun Tang, Beijing (CN); Wei Quan, Beijing (CN); Bingzhao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/144,467

(22) Filed: Sep. 27, 2018

(65) Prior Publication Data

US 2019/0029033 A1    Jan. 24, 2019

Related U.S. Application Data

(63) Continuation of application No. PCT/CN2016/078156, filed on Mar. 31, 2016.

(51) Int. Cl.
*H04W 72/12* (2009.01)
*H04W 72/04* (2009.01)
*H04W 76/27* (2018.01)
*H04L 5/00* (2006.01)
*H04W 28/02* (2009.01)

(52) U.S. Cl.
CPC ....... *H04W 72/1284* (2013.01); *H04L 5/0055* (2013.01); *H04W 28/0278* (2013.01); *H04W 72/042* (2013.01); *H04W 76/27* (2018.02)

(58) Field of Classification Search
CPC .............. H04W 72/042; H04W 72/04; H04W 72/0446; H04W 72/12; H04W 72/1284; H04W 28/0278; H04W 76/27; H04L 5/0055
See application file for complete search history.

(56) References Cited

U.S. PATENT DOCUMENTS

| | | |
|---|---|---|
| 2012/0314680 A1 | 12/2012 | Kela |
| 2013/0016692 A1 | 1/2013 | Chen et al. |
| 2015/0009874 A1 | 1/2015 | Edara et al. |

(Continued)

FOREIGN PATENT DOCUMENTS

| | | |
|---|---|---|
| CN | 101499882 A | 8/2009 |
| CN | 101867978 A | 10/2010 |

(Continued)

OTHER PUBLICATIONS

R2-154534 ASUSTeK,"The Impact of Latency Reduction on UL SPS",3GPP TSG-RAN2 Meeting #91bis,Malmo, Sweden, Sep. 5-9, 2015,total 3 pages.

(Continued)

*Primary Examiner* — Jung H Park
(74) *Attorney, Agent, or Firm* — Fish & Richardson P.C.

(57) ABSTRACT

Example data transmission methods and apparatuses are provided to reduce an uplink transmission latency of a user terminal and improve system resource utilization. One example method includes notifying, by a base station, a user terminal of a semi-persistent SPS period, where the SPS period is a short period. A first SPS resource is allocated, by the base station, to the user terminal. Data that is periodically sent by the user terminal based on the SPS period is received by using the first SPS resource.

14 Claims, 9 Drawing Sheets

(56) References Cited

U.S. PATENT DOCUMENTS

| | | | | |
|---|---|---|---|---|
| 2017/0071010 A1* | 3/2017 | Lim | .................. | H04W 72/1284 |
| 2018/0331792 A1* | 11/2018 | Yang | ..................... | H04L 1/0086 |
| 2019/0037555 A1* | 1/2019 | Kim | .................. | H04W 72/0413 |
| 2019/0090266 A1* | 3/2019 | Zhao | ..................... | H04W 72/04 |
| 2019/0116565 A1* | 4/2019 | Chae | ..................... | G01S 19/256 |
| 2019/0116608 A1* | 4/2019 | Kim | ...................... | H04W 72/04 |

FOREIGN PATENT DOCUMENTS

| | | |
|---|---|---|
| CN | 102158963 A | 8/2011 |
| CN | 103782537 A | 5/2014 |
| CN | 105337709 A | 2/2016 |
| EP | 2234303 A1 | 9/2010 |
| WO | 2015020356 A1 | 2/2015 |

OTHER PUBLICATIONS

Extended European Search Report issued in European Application No. 16895993.0 dated Jan. 28, 2019, 8 pages.

Ericsson:"New WI proposal: L2 latency reduction techniques for LTE", 3GPP TSG RAN Meeting #70 RP-152014, 'Sitges, Spain 7—10, 2015. 8 pages.

3GPP TS 36.211 V13.1.0 (Mar. 2016),3rd Generation Partnership Project;Technical Specification Group Radio Access Network;Evolved Universal Terrestrial Radio Access (E-UTRA);Physical channels and modulation(Release 13), Mar. 2016. 155 pages.

International Search Report and Written Opinion issued in International Application No. PCT/CN2016/078156 dated Dec. 28, 2016, 23 pages.

Office Action issued in Chinese Application No. 201680083470.6 dated Mar. 2, 2020, 36 pages (with English translation).

* cited by examiner

DATA TRANSMISSION METHOD AND APPARATUS

CROSS-REFERENCE TO RELATED APPLICATIONS

This application is a continuation of International Application No. PCT/CN2016/078156, filed on Mar. 31, 2016, the disclosure of which is hereby incorporated by reference in its entirety.

TECHNICAL FIELD

This application relates to the field of communications technologies, and in particular, to a data transmission method and apparatus.

BACKGROUND

A Long Term Evolution (LTE) communications system is characterized by a high transmission rate and a short communication latency, but as technologies such as virtual reality, perception of reality, and self-driving gradually become mature, a higher requirement is imposed on a transmission latency of a wireless communications system.

In an existing semi-persistent scheduling (SPS) method, a user terminal (for example: user equipment) does not need to perform application, and the user terminal does not need to send a buffer status report, and a base station directly periodically provides an uplink resource for the user terminal. Therefore, a transmission latency is reduced to some extent. However, in conventional SPS, one SPS period is usually set to at least 10 ms, that is, 10 subframes, and the user terminal has a transmission opportunity in only one subframe in one SPS period. Therefore, an uplink transmission latency of the user terminal still cannot meet the higher requirement of the wireless communications system for a transmission latency, and still needs to be further reduced.

SUMMARY

This application provides a data transmission method and apparatus, to reduce an uplink transmission latency of a user terminal.

According to a first aspect, a data transmission method is provided, and the method includes: notifying, by a base station, a user terminal of a semi-persistent scheduling SPS period, where the SPS period is a short period; allocating, by the base station, a first SPS resource to the user terminal; and receiving, by the base station, data periodically sent by the user terminal, where the data is sent based on the SPS period by using the first SPS resource.

In this way, an uplink transmission latency of the user terminal can be further reduced, and the user terminal can obtain a transmission opportunity in an even shorter time.

With reference to the first aspect, in a first possible implementation of the first aspect, the short period is used to indicate that a quantity of subframes included in the SPS period is less than 10.

With reference to the first aspect or the first possible implementation of the first aspect, in a second possible implementation of the first aspect, the method further includes: configuring, by the base station, an activation length parameter for the user terminal, where the activation length parameter is used to indicate a quantity of consecutive available subframes in one SPS period.

In this way, the uplink transmission latency can be effectively shortened, and a system resource waste can be reduced.

With reference to the first aspect or the first possible implementation of the first aspect, in a third possible implementation of the first aspect, the receiving, by the base station, data periodically sent by the user terminal includes: receiving, by the base station, initially transmitted data and at least one piece of retransmitted data for the initially transmitted data that are sent by the user terminal, where the initially transmitted data and the at least one piece of retransmitted data occupy the first SPS resource in consecutive SPS periods.

In this way, the uplink transmission latency can be effectively reduced, transmission reliability can be improved, and the base station can more quickly successfully receive the data sent by the user terminal, thereby improving system resource utilization.

With reference to the third possible implementation of the first aspect, in a fourth possible implementation of the first aspect, the at least one piece of retransmitted data and the initially transmitted data include same content; or the at least one piece of retransmitted data and the initially transmitted data carry different incremental redundancy information.

With reference to the third or the fourth possible implementation of the first aspect, in a fifth possible implementation of the first aspect, in a process in which the base station receives the initially transmitted data and the at least one piece of retransmitted data for the initially transmitted data that are sent by the user terminal, the method further includes: receiving, by the base station, a quantity of continuous transmission times that is sent by the user terminal, where the quantity of continuous transmission times indicates a total quantity of times that the initially transmitted data and the retransmitted data are transmitted.

The base station better combines and processes the received data based on the quantity of continuous transmission times.

With reference to any one of the first aspect and the first to the fifth possible implementations of the first aspect, in a sixth possible implementation of the first aspect, before the receiving, by the base station, data periodically sent by the user terminal, the method further includes: indicating, by the base station, a first transmission rule to the user terminal, where the first transmission rule includes: when the retransmitted data and the initially transmitted data conflict with each other on the first SPS resource, preferentially sending the retransmitted data. Therefore, data transmission reliability can be improved.

With reference to any one of the first aspect and the first to the sixth possible implementations of the first aspect, in a seventh possible implementation of the first aspect, after the allocating, by the base station, a first SPS resource to the user terminal, the method further includes: if the base station receives a buffer status report BSR sent by the user terminal, performing, by the base station, the following operation based on the BSR: allocating a physical uplink shared channel PUSCH resource to the user terminal; or allocating a second SPS resource to the user terminal, where an amount of data that can be carried on the second SPS resource is greater than an amount of data that can be carried on the first SPS resource.

In this way, data that is of a relatively large data amount and that is to be transmitted by the user terminal can be scheduled quickly, and the system resource waste and control overheads can be reduced.

With reference to the seventh possible implementation of the first aspect, in an eighth possible implementation of the first aspect, the base station sends a first indication message to the user terminal, and the first indication message carries information about the PUSCH resource allocated to the user terminal; and the first indication message further carries SPS frozen instruction information, and the SPS frozen instruction information is used to instruct the user terminal to: after sending data by using the PUSCH resource, suspend occupying the first SPS resource within a specified frozen time, and resume occupying the first SPS resource when the frozen time ends. In this way, the system resource waste can be avoided.

With reference to the seventh possible implementation of the first aspect, in a ninth possible implementation of the first aspect, the base station sends an activation message to the user terminal, and the activation message carries the second SPS resource allocated to the user terminal; and the activation message further carries an effective time, and the activation message is used to notify the user terminal that the user terminal is allowed to send data within the effective time by using the second SPS resource, and is used to instruct the user terminal to: when the effective time ends, stop occupying the second SPS resource, and resume occupying the first SPS resource. In this way, the system resource waste is avoided.

With reference to the seventh or the ninth possible implementation of the first aspect, in a tenth possible implementation of the first aspect, after the allocating, by the base station, a second SPS resource to the user terminal, the method further includes: after it is determined that the user terminal sends all the to-be-sent data, sending an SPS resource release command to the user terminal, where the SPS resource release command is used to instruct the user terminal to stop occupying the second SPS resource and resume occupying the first SPS resource.

A two-level SPS mode is used, so that use of a small SPS resource can be resumed when a large SPS resource is released, thereby avoiding a resource waste.

With reference to any one of the first aspect and the first to the tenth possible implementations of the first aspect, in an eleventh possible implementation of the first aspect, after the allocating, by the base station, a first SPS resource to the user terminal, the method further includes: receiving, by the base station, a second indication message sent by the user terminal; and if the second indication message is used to indicate that the user terminal no longer needs to occupy the first SPS resource, releasing, by the base station, the first SPS resource; or if the second indication message is used to indicate that the user terminal does not need to occupy the first SPS resource within a predetermined time period, releasing, by the base station, the first SPS resource within the predetermined time period, and re-scheduling the first SPS resource for the user terminal when the predetermined time period ends.

In this way, in a user terminal—assisted scheduling manner, when the user terminal has no data to be sent, an SPS resource occupied by the user terminal can be released in a timely manner, and the released SPS resource is used for another purpose, so that resource utilization is improved, and the system resource waste is avoided.

With reference to the eleventh possible implementation of the first aspect, in a twelfth possible implementation of the first aspect, the receiving, by the base station, a second indication message sent by the user terminal includes: detecting, by the base station, a pilot signal sent by the user terminal, and obtaining the second indication message by using a cyclic shift value in the pilot signal; or receiving, by the base station by using a control element CE at a Media Access Control MAC layer, the second indication message sent by the user terminal.

With reference to any one of the first aspect and the first to the eleventh possible implementations of the first aspect, in a thirteenth possible implementation of the first aspect, in a time division duplex TDD system, before the receiving, by the base station, data sent by the user terminal, the method further includes: determining, by the base station, an SPS occupation subframe according to a third transmission rule, where the third transmission rule includes: determining, based on the SPS period, the SPS occupation subframe within a time occupied by all types of subframes, where if the determined SPS occupation subframe is an uplink subframe, data can be sent by using the uplink subframe, or if the SPS occupation subframe determined in any SPS period is a non-uplink subframe, namely, a downlink subframe or a special subframe, occupying the non-uplink subframe is abandoned; or determining, based on the SPS period, the SPS occupation subframe within a time occupied by all uplink subframes, and sending data by using the subframes; or determining, based on the SPS period, the SPS occupation subframe within a time occupied by all types of subframes, and sending data by using the SPS occupation subframe, where in a process of determining the SPS occupation subframe, if the determined SPS occupation subframe is a non-uplink subframe, a first uplink subframe after the non-uplink subframe is determined as the SPS occupation subframe.

A problem that a subframe with an SPS configuration is not an available uplink subframe in a short-period SPS scheduling scenario is resolved.

With reference to any one of the first aspect and the first to the thirteenth possible implementations of the first aspect, in a fourteenth possible implementation of the first aspect, before the receiving, by the base station, data sent by the user terminal, the method further includes: indicating, by the base station, a second transmission rule to the user terminal, where the second transmission rule includes: skipping sending, by the user terminal, a padding data packet in a subframe in which neither a service data unit SDU at the MAC layer nor a specific CE at the MAC layer is sent, where the specific CE at the MAC layer includes one or more of a regular BSR, a periodic BSR, and a periodic power headroom report PHR; and when no SDU at the MAC layer needs to be sent, skipping sending, by the user terminal, the periodic BSR and/or the periodic PHR. In this way, power of the user terminal can be saved, and the system resource waste can be avoided.

With reference to any one of the first aspect and the first to the fourteenth possible implementations of the first aspect, in a fifteenth possible implementation of the first aspect, before the receiving, by the base station, data sent by the user terminal, the method further includes: determining, by the base station, a fourth transmission rule, and indicating the fourth transmission rule to the user terminal, where the fourth transmission rule includes: when determining that data is sent without a need to occupy the first SPS resource, configuring or starting, by the user terminal, to ignore an uplink grant; and when configuring or starting to ignore the uplink grant, skipping sending a periodic sounding reference signal SRS and a periodic physical uplink control channel PUCCH; or after configuring or starting to ignore the uplink grant, when a quantity of times that the uplink grant is ignored reaches a first threshold or a time in which the uplink grant is ignored reaches a second threshold, skipping sending a periodic SRS and a periodic PUCCH.

In this way, the power of the user terminal can be saved, and uplink interference can be reduced.

According to a second aspect, another data transmission method is provided, including: receiving, by a user terminal, an SPS period configured by a base station, where the SPS period is a short period; determining, by the user terminal, a first SPS resource allocated by the base station; and periodically sending, by the user terminal, data to the base station, where the data is sent based on the SPS period by using the first SPS resource.

In this way, an uplink transmission latency of the user terminal can be further reduced, and the user terminal can obtain a transmission opportunity in an even shorter time.

With reference to the second aspect, in a first possible implementation of the second aspect, the short period is used to indicate that a quantity of subframes included in the SPS period is less than 10.

With reference to the second aspect or the first possible implementation of the second aspect, in a second possible implementation of the second aspect, the method further includes: receiving, by the user terminal, an activation length parameter configured by the base station, where the activation length parameter is used to indicate a quantity of consecutive available subframes in one SPS period; and the sending, by the user terminal, data to the base station includes: sending, by the user terminal in the SPS period, the data based on the activation length parameter by using consecutive available subframes.

In this way, the uplink transmission latency can be effectively shortened, and a system resource waste can be reduced.

With reference to the second aspect or the first possible implementation of the second aspect, in a third possible implementation of the second aspect, the sending, by the user terminal, data to the base station includes: sending, by the user terminal, initially transmitted data and at least one piece of retransmitted data for the initially transmitted data to the base station by using the first SPS resource in consecutive SPS periods.

In this way, the uplink transmission latency can be effectively reduced, transmission reliability can be improved, and the base station can more quickly successfully receive the data sent by the user terminal, thereby improving system resource utilization.

With reference to the third possible implementation of the second aspect, in a fourth possible implementation of the second aspect, the at least one piece of retransmitted data and the initially transmitted data include same content; or the at least one piece of retransmitted data and the initially transmitted data carry different incremental redundancy information.

With reference to the third or the fourth possible implementation of the second aspect, in a fifth possible implementation of the second aspect, in a process of sending the initially transmitted data and the at least one piece of retransmitted data for the initially transmitted data to the base station by using the consecutive SPS periods, the user terminal sends a quantity of continuous transmission times to the base station, where the quantity of continuous transmission times indicates a quantity of times that the initially transmitted data and the retransmitted data are transmitted. The base station better combines and processes the received data based on the quantity of continuous transmission times.

With reference to the fifth possible implementation of the second aspect, in a sixth possible implementation of the second aspect, the sending, by the user terminal, a quantity of continuous transmission times to the base station includes: sending, by the user terminal, a pilot signal to the base station, where a cyclic shift value in the pilot signal is used to indicate the quantity of continuous transmission times; or sending, by the user terminal, the quantity of continuous transmission times to the base station by using a control element CE at a Media Access Control MAC layer.

With reference to any one of the second aspect and the first to the sixth possible implementations of the second aspect, in a seventh possible implementation of the second aspect, the method further includes: receiving, by the user terminal, a first transmission rule sent by the base station; and in a process of sending the data to the base station, when the retransmitted data and the initially transmitted data conflict with each other on the first SPS resource according to the first transmission rule, preferentially sending the retransmitted data. Therefore, data transmission reliability can be improved.

With reference to any one of the second aspect and the first to the seventh possible implementations of the second aspect, in an eighth possible implementation of the second aspect, the method further includes: sending, by the user terminal, a buffer status report BSR to the base station, where the BSR carries an amount of data to be sent by the user terminal; and after sending the BSR, receiving, by the user terminal, a first indication message sent by the base station, and determining, based on the first indication message, information about a physical uplink shared channel PUSCH resource allocated by the base station; or after sending the BSR, receiving, by the user terminal, an activation message sent by the base station, and determining, based on the activation message, a second SPS resource allocated by the base station, where an amount of data that can be carried on the second SPS resource is greater than an amount of data that can be carried on the first SPS resource.

In this way, data that is of a relatively large data amount and that is to be transmitted by the user terminal can be scheduled quickly, and the system resource waste and control overheads can be reduced.

With reference to the eighth possible implementation of the second aspect, in a ninth possible implementation of the second aspect, the first indication message further carries SPS frozen instruction information, and the method further includes: determining, by the user terminal, a specified frozen time based on the SPS frozen instruction information; and after sending the data based on the SPS frozen instruction information by using the PUSCH resource, suspending occupation of the first SPS resource within the frozen time, and resuming occupation of the first SPS resource when the frozen time ends. In this way, the system resource waste can be avoided.

With reference to the eighth possible implementation of the second aspect, in a tenth possible implementation of the second aspect, the activation message further carries an effective time, and the method further includes: sending, by the user terminal based on the activation message, the data within the effective time by using the second SPS resource, and after the effective time ends, stopping occupying the second SPS resource, and resuming occupation of the first SPS resource. In this way, the system resource waste is avoided.

With reference to the eighth or the tenth possible implementation of the second aspect, in an eleventh possible implementation of the second aspect, after the receiving, by the user terminal, an activation message sent by the base station, and determining, based on the activation message, a second SPS resource allocated by the base station, the method further includes: sending, by the user terminal, the data by using the second SPS resource; after sending the to-be-sent data, receiving, by the user terminal, an SPS resource release command sent by the base station; and stopping, by the user terminal based on the SPS resource release command, occupying the second SPS resource, and resuming occupation of the first SPS resource.

A two-level SPS mode is used, so that use of a small SPS resource can be resumed when a large SPS resource is released, thereby avoiding a resource waste.

With reference to any one of the second aspect and the first to the eleventh possible implementations of the second aspect, in a twelfth possible implementation of the second aspect, the method further includes: sending, by the user terminal, a second indication message to the base station when determining that the first SPS resource does not need to be occupied, where the second indication message is used to instruct the base station to release the first SPS resource, or the second indication message is used to instruct the base station to release the first SPS resource within a predetermined time period, and re-schedule the first SPS resource for the user terminal after the predetermined time period ends.

In this way, in a user terminal—assisted scheduling manner, when the user terminal has no data to be sent, an SPS resource occupied by the user terminal can be released in a timely manner, and the released SPS resource is used for another purpose, so that resource utilization is improved, and the system resource waste is avoided.

With reference to the twelfth possible implementation of the second aspect, in a thirteenth possible implementation of the second aspect, the sending, by the user terminal, a second indication message to the base station includes: sending, by the user terminal, a pilot signal to the base station, and using a cyclic shift value in the pilot signal to represent the second indication message; or sending, by the user terminal, the second indication message to the base station by using a control element CE at a Media Access Control MAC layer.

With reference to any one of the second aspect and the first to the twelfth possible implementations of the second aspect, in a fourteenth possible implementation of the second aspect, the method further includes: receiving, by the user terminal, a second transmission rule sent by the base station, skipping sending a padding data packet in a subframe in which neither a service data unit SDU at the MAC layer nor a specific CE at the MAC layer is sent, and skipping sending a periodic BSR and/or a periodic power headroom report PHR when no SDU at the MAC layer needs to be sent, where the specific CE at the MAC layer includes one or more of a regular BSR, a periodic BSR, and a periodic PHR.

A problem that a subframe with an SPS configuration is not an available uplink subframe in a short-period SPS scheduling scenario is resolved.

With reference to any one of the second aspect and the first to the fourteenth possible implementations of the second aspect, in a fifteenth possible implementation of the second aspect, the method further includes: starting a timer when the user terminal stops sending any data by using the first SPS resource; and when the timer expires, if it is determined that no data is sent to the base station within a timing time of the timer, sending the data to the base station, where the timing time of the timer is less than that of a time alignment TA timer. Therefore, the user terminal can implement uplink synchronization when the user terminal does not send uplink data.

With reference to any one of the second aspect and the first to the fifteenth possible implementations of the second aspect, in a sixteenth possible implementation of the second aspect, the method further includes: in a time division duplex TDD system, before the sending data to the base station, receiving a third transmission rule sent by the base station, where the third transmission rule is used to determine an SPS occupation subframe, and the SPS occupation subframe is a subframe occupied when the user terminal sends data based on the SPS period; and the periodically sending, by the user terminal, data to the base station based on the SPS period by using the first SPS resource includes: determining, based on the SPS period, the SPS occupation subframe within a time occupied by all types of subframes, where if the determined SPS occupation subframe is an uplink subframe, data can be sent by using the uplink subframe, or if the SPS occupation subframe determined in any SPS period is a non-uplink subframe, namely, a downlink subframe or a special subframe, occupying the non-uplink subframe is abandoned; or determining, based on the SPS period, the SPS occupation subframe within a time occupied by all uplink subframes, and sending data by using the subframes; or determining, based on the SPS period, the SPS occupation subframe within a time occupied by all types of subframes, and sending data by using the SPS occupation subframe, where in a process of determining the SPS occupation subframe, if the determined SPS occupation subframe is a non-uplink subframe, a first uplink subframe after the non-uplink subframe is determined as the SPS occupation subframe.

The problem that a subframe with an SPS configuration is not an available uplink subframe in a short-period SPS scheduling scenario is resolved.

With reference to any one of the second aspect and the first to the sixteenth possible implementations of the second aspect, in a seventeenth possible implementation of the second aspect, the method further includes: before sending the data to the base station, receiving, by the user terminal, a fourth transmission rule sent by the base station; when determining, according to the fourth transmission rule, that the data is sent without a need to occupy the first SPS resource, configuring or starting, by the user terminal, to ignore an uplink grant; and when configuring or starting to ignore the uplink grant, skipping sending a periodic SRS and a periodic PUCCH; or after configuring or starting to ignore the uplink grant, when a quantity of times that the uplink grant is ignored reaches a first threshold or a time in which the uplink grant is ignored reaches a second threshold, skipping sending a periodic sounding reference signal SRS and a periodic physical uplink control channel PUCCH.

In this way, the power of the user terminal can be saved, and uplink interference can be reduced.

According to a third aspect, a data transmission apparatus is provided. The data transmission apparatus has a function of implementing any method design according to the first aspect and the first to the fifteenth possible implementations of the first aspect. The function may be implemented by using hardware, or may be implemented by executing corresponding software by hardware. The hardware or the software includes one or more modules corresponding to the function.

With reference to the third aspect, in a first possible implementation of the third aspect, a structure of the data transmission apparatus includes a transceiver and a processor. The processor is configured to invoke a group of programs, to perform the following operations: notifying a user terminal of a semi-persistent scheduling SPS period, where the SPS period is a short period; and allocating a first SPS resource to the user terminal. The transceiver is configured to send data to the user terminal or receive data periodically sent by the user terminal, where the data periodically sent by the user terminal is sent based on the SPS period by using the first SPS resource.

In this way, an uplink transmission latency of the user terminal can be further reduced, and the user terminal can obtain a transmission opportunity in an even shorter time.

With reference to the first possible implementation of the third aspect, in a second possible implementation of the third aspect, the processor is further configured to invoke a program to enable the data transmission apparatus to perform the method according to any one of the first to the fifteenth possible implementations of the first aspect.

According to a fourth aspect, a data transmission apparatus is provided. The data transmission apparatus has a function of implementing any method design according to the second aspect and the first to the seventeenth possible implementations of the second aspect. The function may be implemented by using hardware, or may be implemented by executing corresponding software by hardware. The hardware or the software includes one or more modules corresponding to the function.

With reference to the fourth aspect, in a first possible implementation of the fourth aspect, a structure of the data transmission apparatus includes a transceiver and a processor. The transceiver is configured to send data to a base station or receive data sent by a base station, and is specifically configured to receive an SPS period configured by the base station, where the SPS period is a short period. The processor is configured to invoke a group of programs, to perform the following operations: determining a first SPS resource allocated by the base station, schedule data sent by the transceiver to the base station, and process received data. The transceiver is further configured to periodically send data to the base station, where the data is sent based on the SPS period by using the first SPS resource.

In this way, an uplink transmission latency of the user terminal can be further reduced, and the user terminal can obtain a transmission opportunity in an even shorter time.

With reference to the first possible implementation of the fourth aspect, in a second possible implementation of the fourth aspect, the processor is further configured to invoke a program to enable the data transmission apparatus to perform the method according to any one of the first to the seventeenth possible implementations of the second aspect.

According to a fifth aspect, a computer storage medium is provided and is configured to store a computer software instruction used by the data transmission apparatus according to the foregoing aspect. The computer software instruction includes a program designed to execute the foregoing aspect.

In the solutions provided in the embodiments of this application, a short-period SPS scheduling manner is used, so that the uplink transmission latency of the user terminal can be further reduced, and the user terminal can obtain a transmission opportunity in an even shorter time.

DESCRIPTION OF EMBODIMENTS

To make the objectives, technical solutions, and advantages of this application clearer, the following further describes this application in detail with reference to the accompanying drawings. Apparently, the described embodiments are merely some rather than all of the embodiments of this application. All other embodiments obtained by persons of ordinary skill in the art based on the embodiments of this application without creative efforts shall fall within the protection scope of this application.

The embodiments of this application are applicable to a wireless communications system, and in particular, to a Long Term Evolution (LTE) system, and are suitable for processing a data transmission scenario with a low latency requirement.

To further reduce an uplink transmission latency of a user terminal, a short-period SPS resource allocation mode is used in the embodiments of this application, in other words, a method for shortening an SPS period is used, so that the user terminal can obtain a transmission opportunity in an even shorter time.

Figure 1:
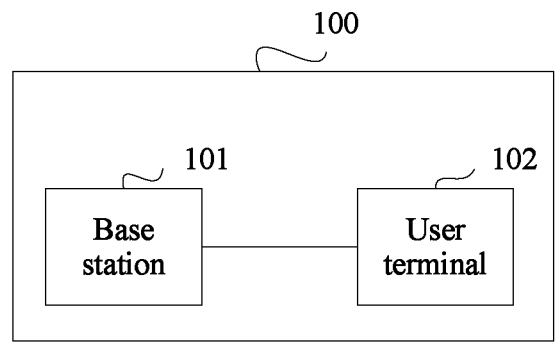
FIG. 1 is a schematic diagram of a system architecture according to an embodiment of this application.

A system architecture to which the embodiments of this application are applied is shown in FIG. 1, and a wireless communications system 100 includes a base station 101 and a user terminal 102. The base station 101 is responsible for allocating an uplink air interface resource, and indicating a scheduling result to the user terminal 102. The user terminal 102 is configured to receive an uplink scheduling indication of the base station 101, and send data based on a buffer status of the user terminal 102.

A method provided in the embodiments of this application is further described in detail below with reference to the accompanying drawings.

Figure 2:
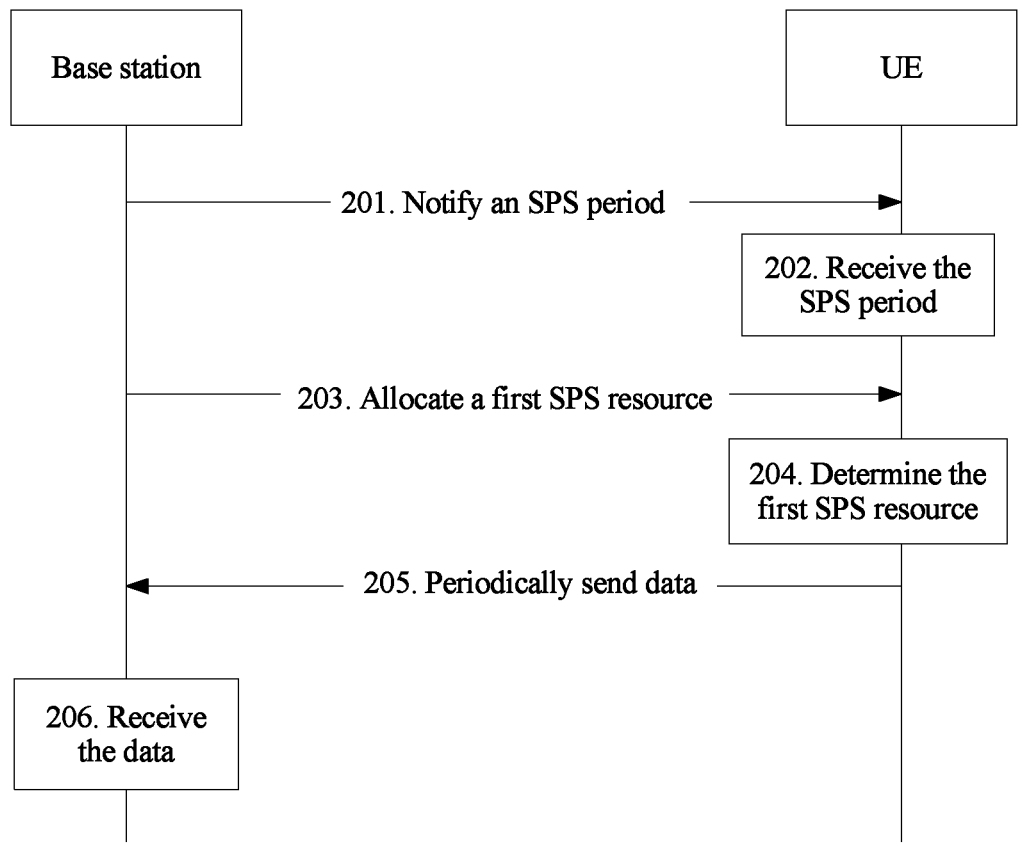
FIG. 2 is a flowchart of a data transmission method based on semi-persistent scheduling according to an embodiment of this application.

As shown in FIG. 2, a procedure of a method provided in an embodiment of this application is as follows. A user terminal described below in this embodiment of this application is any user terminal scheduled by a base station.

Step 201: A base station notifies a user terminal of a semi-persistent scheduling SPS period, where the SPS period is a short period.

The short period in this embodiment of this application is used to indicate that a quantity of subframes included in the SPS period is less than a minimum value in a standard SPS period configuration. An SPS period in an existing standard is usually set to 10 ms, in other words, a length of 10 subframes. Therefore, the foregoing short period is used to indicate that the quantity of subframes included in the SPS period is less than 10.

For example, the SPS period is shortened to 5 ms or 2 ms, and can be shortened to a minimum of 1 ms. Optionally, the SPS period may be even shorter, such as 0.5 ms, 0.2 ms, or 0.1 ms. A unit of the SPS period may be ms, a subframe quantity, a transmission time interval (TTI) quantity, or an OFDM symbol quantity, and this is not limited in the present invention.

Generally, the SPS period may alternatively be 10 ms, 20 ms, or another value in the prior art. In the embodiments of the present invention, the SPS period may also be 10 ms, 20 ms, or another value in the prior art.

Specifically, the base station may add SPS period configuration information to a Radio Resource Control (RRC) message sent to the user terminal.

Step 202: The user terminal receives the SPS period configured by the base station.

Specifically, the user terminal receives the RRC message sent by the base station, and determines the SPS period by using the SPS period configuration information carried in the RRC message.

Step 203: The base station allocates a first SPS resource to the user terminal.

For ease of description, in this embodiment of this application, an SPS resource allocated by the base station to the user terminal in this step is referred to as the first SPS resource.

Specifically, the base station delivers an SPS activation message by using a physical downlink control channel (PDCCH), and indicates an SPS resource location in the SPS activation message.

Because the SPS period is shortened in this embodiment of this application, and it is assumed that the SPS period is shortened to 1 ms, the user terminal has a transmission opportunity in each uplink subframe. If a size of a single SPS resource allocated by the base station to the user terminal is set according to an upper limit of a single data amount of the user terminal, the user terminal does not transmit a maximum amount of data each time. Consequently, a single data transmission resource is definitely wasted.

Preferably, in this embodiment of this application, the base station allocates the first SPS resource to the user terminal in but being not limited to the following manner: The user terminal sets, based on a minimum value of an amount of data sent by the user terminal in one SPS period, a size of a first SPS resource available in one SPS period.

For example, the first SPS resource that is allocated by the base station to the user terminal and that is available in one SPS period is applicable to transmission of a buffer status report (BSR) or another small data packet with a data amount that is equal to or close to that of the BSR.

Step 204: The user terminal determines the first SPS resource allocated by the base station.

Specifically, the user terminal receives the SPS activation message delivered by the base station, and determines, by using information carried in the SPS activation message, a location of the first SPS resource allocated by the base station.

Step 205: The user terminal periodically sends data to the base station based on the SPS period by using the first SPS resource.

After an SPS configuration takes effect, the user terminal may send data in each SPS period at the location of the first SPS resource.

Step 206: The base station receives the data that is periodically sent by the user terminal based on the SPS period by using the first SPS resource.

The foregoing is a basic procedure of a data transmission method based on semi-persistent scheduling according to an embodiment of this application. More detailed descriptions are provided below with reference to specific embodiments.

It should be uniformly noted that a grid area in FIG. 3 to FIG. 7 indicates that the user terminal sends data by using an SPS resource.

Figure 3:
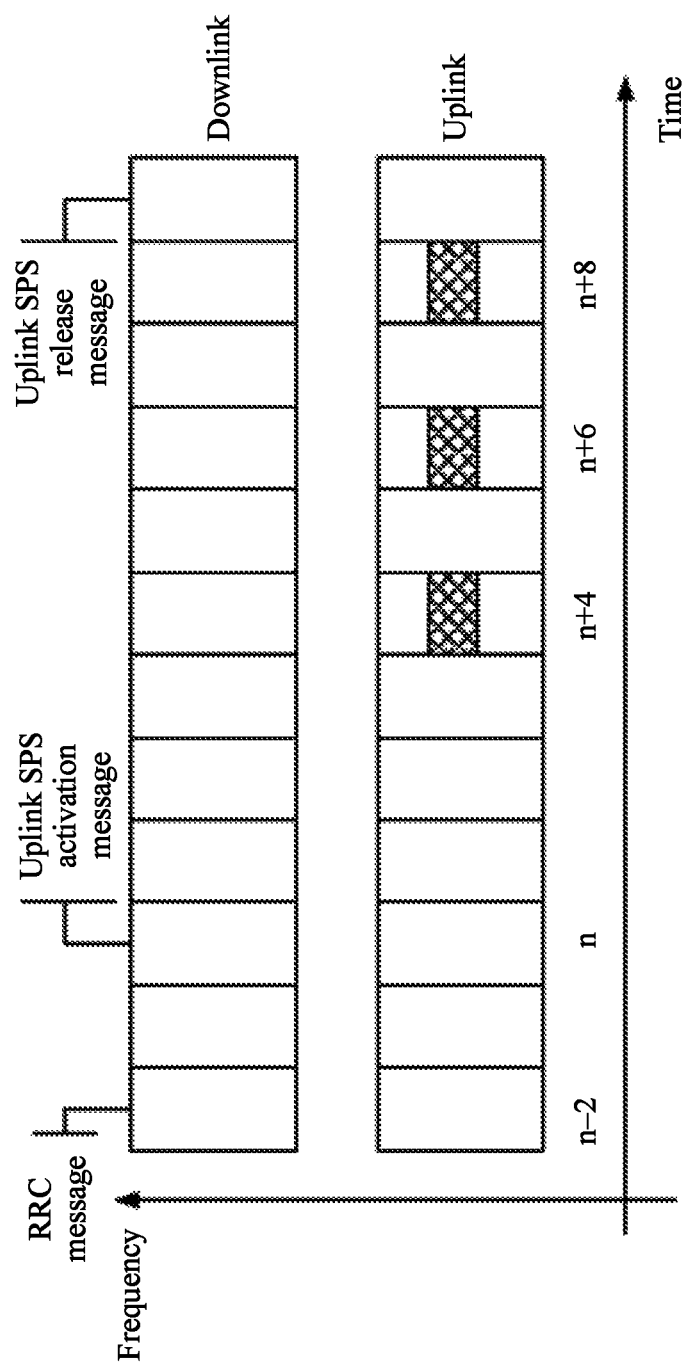
FIG. 3 is a schematic diagram 1 of an SPS scheduling process according to an embodiment of this application.

A frequency division duplex (FDD) mode is used as an example. When the SPS period is shortened to 2 ms, an SPS scheduling process is shown in FIG. 3. The base station sends an RRC message to the user terminal in a subframe (n−2), adds a configuration such as an SPS period to the RRC message, delivers an SPS activation message in a subframe n by using a PDCCH, and indicates, in the SPS activation message, information such as a specific SPS frequency-domain resource location. An SPS configuration takes effect in a subframe (n+4), and the user terminal sends data in the subframe (n+4) and each subsequent SPS period on a same frequency-domain resource, until the base station delivers an SPS resource release message.

If the SPS period is shortened to 1 ms, the user terminal can have an uplink transmission opportunity in each uplink subframe. An uplink transmission latency of the user terminal can be shortened in this way, but if the user terminal does not need to send data in each uplink subframe, some subframes are undoubtedly idle, thereby wasting system resources.

Based on the foregoing considerations and some other problems caused by shortening the SPS period, preferably, based on the method shown in FIG. 2, an embodiment of this application further provides optimized solutions, to resolve a problem of a system resource waste while shortening the uplink transmission latency.

Optimized Solution 1:

The base station configures an activation length parameter for the user terminal, and the activation length parameter is used to indicate a quantity of consecutive available subframes in one SPS period.

The user terminal receives the activation length parameter configured by the base station, and sends, in the SPS period, data based on the activation length parameter by using consecutive available subframes.

Specifically, the base station determines, based on a service feature of the user terminal, a time length that needs to be occupied by the user terminal to send data, to further determine the activation length parameter.

The user terminal sends, in one SPS period, data by using consecutive available subframes, and does not need to wait for sending opportunities in a plurality of SPS periods, so that an uplink transmission latency can be effectively shortened. In addition, the base station may release an idle subframe in the SPS period other than the consecutive subframes occupied by the user terminal, so that a resource that is not required by the user terminal can be separated from the SPS resource and used for another purpose, thereby reducing a system resource waste.

Figure 4:
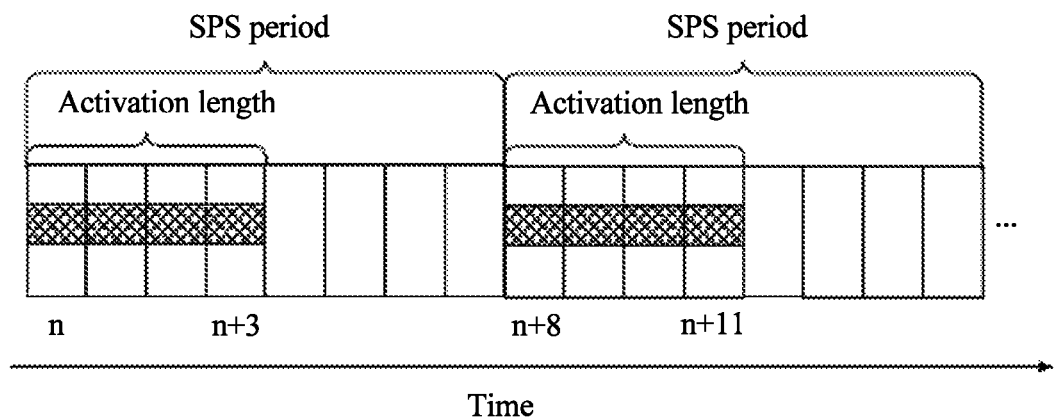
FIG. 4 is a schematic diagram 2 of an SPS scheduling process according to an embodiment of this application.

For example, as shown in FIG. 4, the SPS period configured by the base station for the user terminal is 8 ms, and if the base station determines, based on the service feature of the user terminal, that a time length that needs to be occupied by the user terminal to send data once is 4 ms, the base station notifies, by using the activation length parameter, the user terminal that the user terminal may send data by using four consecutive subframes in one SPS period.

Certainly, the foregoing optimized solution 1 is applicable not only to an application scenario of short-period SPS scheduling, but also to an application scenario of long-period SPS scheduling.

Optimized solution 2: The user terminal sends initially transmitted data and at least one piece of retransmitted data for the initially transmitted data to the base station by using the first SPS resource in consecutive SPS periods.

The base station receives the initially transmitted data and the at least one piece of retransmitted data for the initially transmitted data that are sent by the user terminal, and the initially transmitted data and the at least one piece of retransmitted data occupy the first SPS resource in the consecutive SPS periods.

The at least one piece of retransmitted data and the initially transmitted data include same content, or the at least one piece of retransmitted data and the initially transmitted data carry different incremental redundancy information.

Preferably, the user terminal sends a quantity of continuous transmission times to the base station in a process of sending the initially transmitted data and the at least one piece of retransmitted data for the initially transmitted data to the base station by using the consecutive SPS periods.

Specifically, in the prior art, one hybrid automatic repeat request (HARQ) period is usually 8 ms, and after the user terminal sends initially transmitted data, if the base station feeds back a negative acknowledgement (NACK) message, the user terminal needs to send retransmitted data to the base station, but the user terminal can send the retransmitted data once only after 8 ms since the initially transmitted data is sent. According to the foregoing optimized solution 2 in this embodiment of this application, in short-period SPS scheduling, the user terminal sends the initially transmitted data and the at least one piece of retransmitted data in the consecutive SPS periods. To be specific, after sending the initially transmitted data, the user terminal directly sends the retransmitted data to the base station without a need to wait for a NACK message fed back by the base station. In this way, data transmission reliability can be improved, and the base station can more quickly obtain correct data through parsing.

The initially transmitted data and the retransmitted data may be simple repetition, to be specific, include same content; or the initially transmitted data and the retransmitted data carry different redundancy version based on a HARQ retransmission mode, in other words, by using different redundancy versions.

The base station may specify the quantity of continuous transmission times, and notify the user terminal of the quantity of continuous transmission times; or the user terminal may determine any quantity of continuous transmission times based on information such as a channel status, and notifies the base station of the any quantity of continuous transmission times. The quantity of continuous transmission times indicates a total quantity of times that the initially transmitted data and the retransmitted data are transmitted. Specifically, the quantity of continuous transmission times may be displayed and notified by using a CE at a MAC layer (MAC CE); or a pilot signal may be sent to the base station, and the quantity of continuous transmission times is directly or indirectly represented by a cyclic shift value in the pilot signal. The cyclic shift value is used to directly represent the quantity of continuous transmission times. For example, a cyclic shift value 3 indicates that the quantity of continuous transmission times is three. The cyclic shift value is used to indirectly represent the quantity of continuous transmission times. For example, if an index value corresponding to a cyclic shift value 3 in a demodulation reference signal (DMRS) configuration table is 2, it indicates that the quantity of continuous transmission times is two.

The foregoing optimized solution 2 is described below by using an example.

The FDD mode is still used as an example, and it is assumed that the SPS period is 1 ms.

It is assumed that data to be sent by the user terminal can be sent on an SPS resource of a single subframe.

Figure 5A:
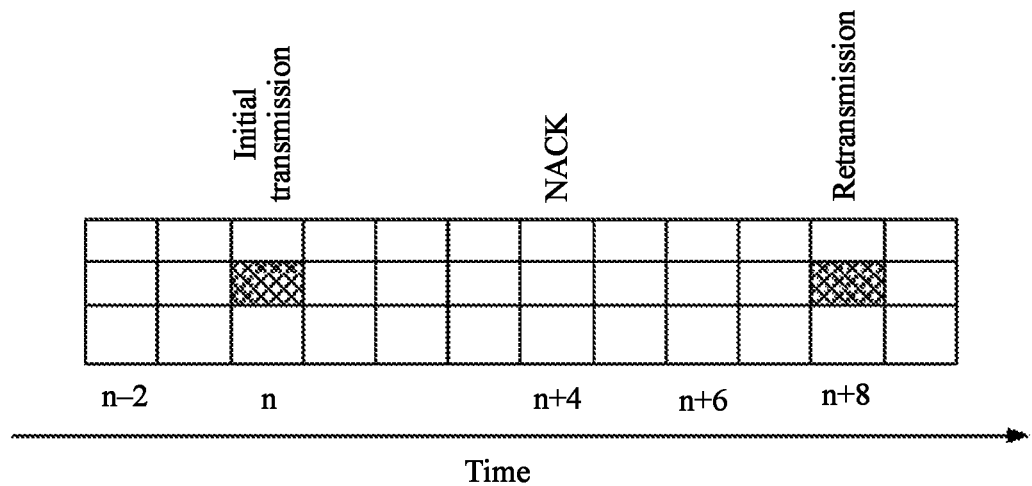
FIG. 5a is a schematic diagram of data transmission of a user terminal in the prior art.

As shown in FIG. 5a, in the prior art, the user terminal sends initially transmitted data on an SPS resource of a subframe n, and if the user terminal receives, in a subframe (n+4), a NACK message fed back by the base station, the user terminal needs to send retransmitted data in a subframe (n+8). In this way, 9 ms is required by the base station to receive the initially transmitted data and one piece of retransmitted data sent by the user terminal.

Figure 5B:
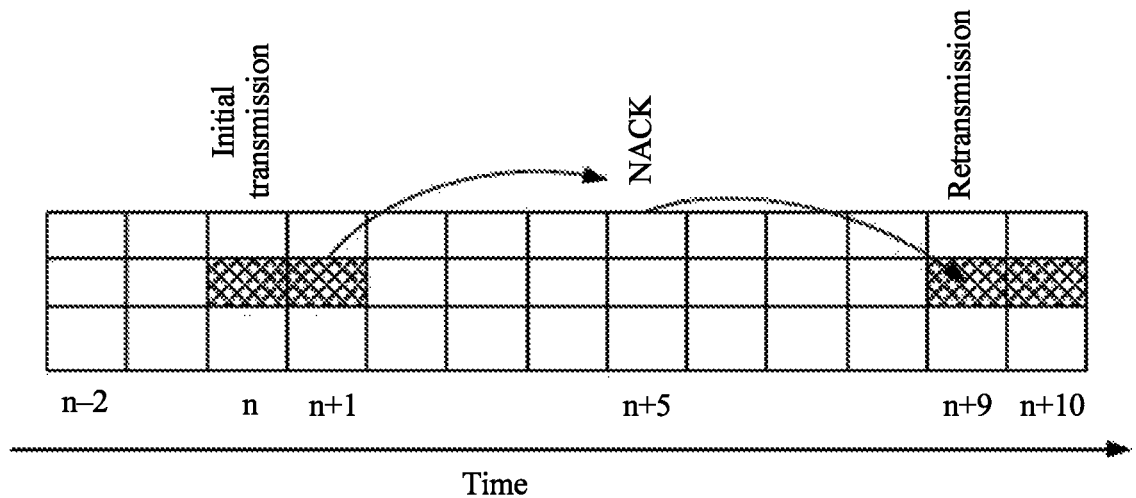
FIG. 5b is a schematic diagram 1 of data transmission of a user terminal according to an embodiment of this application.

As shown in FIG. 5b, in this embodiment of this application, the user terminal sends the initially transmitted data on an SPS resource of a subframe n, and if the quantity of continuous transmission times is two, the user terminal continues to send the retransmitted data on an SPS resource of a subframe (n+1). The base station indicates an ACK/NACK message in a fourth subframe after the subframe (n+1), namely, a subframe (n+5). Because the base station directly receives the initially transmitted data and the retransmitted data sent by the user terminal, a probability that the base station can successfully receive the data is greatly increased. If the base station successfully receives the data, the base station feeds back an ACK message to the user terminal in the subframe (n+5). If the base station still cannot successfully receive the data, the base station feeds back a NACK message to the user terminal in the subframe (n+5). After receiving the NACK message that is fed back by the base station, the user terminal continues to send the retransmitted data to the base station in a subframe (n+9) and a subframe (n+10).

In this way, 6 ms is required by the base station to receive the initially transmitted data and one piece of retransmitted data sent by the user terminal.

Figure 5C:
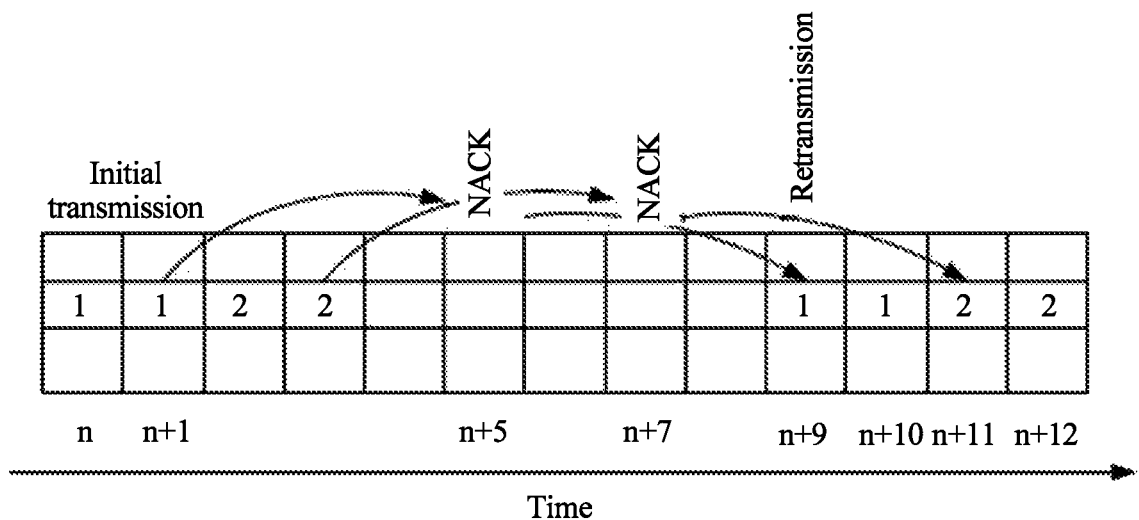
FIG. 5c is a schematic diagram 2 of data transmission of a user terminal according to an embodiment of this application.

Certainly, if the data to be sent by the user terminal needs to be sent by using two or more subframes, the user terminal repeatedly transmits, in the foregoing sending manner, initially transmitted data that is sent on an SPS resource of each subframe. For example, as shown in FIG. 5c, the data to be sent by the user terminal needs to be sent by using SPS resources of two subframes, and two data blocks sent on the SPS resources of the two subframes by using the data sent by the user terminal are represented by signs 1 and 2. The user terminal sends initially transmitted data of the data block 1 in a subframe n, sends retransmitted data of the data block 1 in a subframe (n+1), sends initially transmitted data of the data block 2 in a subframe (n+2), and sends retransmitted data of the data block 2 in a subframe (n+3). In this continuous transmission manner, data transmission reliability can be improved, and the base station is more capable of successfully receiving data. If the base station still cannot successfully receive data, the base station separately feeds back a NACK message for the data block 1 and a NACK message for the data block 2 to the user terminal in a subframe (n+5) and a subframe (n+7). The user terminal continues to send the retransmitted data of the data block 1 to the base station in a subframe (n+9) and a subframe (n+10) separately, and continues to send the retransmitted data of the data block 2 to the base station in a subframe (n+11) and a subframe (n+12) separately.

Preferably, the foregoing optimized solution 2 is applicable to a case in which a time length that needs to be occupied by the data to be sent by the user terminal is not greater than one HARQ period.

According to the method, provided in the foregoing optimized solution 2, for continuously transmitting the initially transmitted data and the retransmitted data, an uplink transmission latency can be effectively reduced, and transmission reliability can be improved, so that the base station can more quickly successfully receive the data sent by the user terminal, thereby improving system resource utilization.

Optimized solution 3: In consideration of stipulation in an existing LTE protocol, an SPS resource is used for new data transmission by default, and especially for a short-period SPS scheduling scenario in this embodiment of this application, non-adaptive retransmission may also occur on the SPS resource. Therefore, newly transmitted data and retransmitted data may conflict with each other on the SPS resource. In this case, according to the stipulation in the existing protocol, retransmission is discarded and only new transmission is performed, and consequently transmission reliability is reduced. In this embodiment of this application, after allocating the first SPS resource to the user terminal, and before receiving the data sent by the user terminal, the base station indicates a first transmission rule to the user terminal. The first transmission rule includes: when the retransmitted data and the initially transmitted data conflict with each other on the first SPS resource, preferentially sending the retransmitted data. Therefore, data transmission reliability can be improved.

The first transmission rule may be stipulated in a protocol. For example, when the SPS period is less than or equal to a specific threshold, the first transmission rule takes effect. The specific threshold may be 2 ms, 1 ms, two subframes, one subframe, two OFDM symbols, one OFDM symbol, or the like, and this is not limited in this application. The first transmission rule may be stipulated in a protocol. For example, when the SPS period is less than or equal to a specific threshold and an uplink grant ignoring function is configured or started or a second transmission rule in the optimized solution 6 is started, the first transmission rule takes effect. The specific threshold may be 2 ms, 1 ms, two subframes, one subframe, two OFDM symbols, one OFDM symbol, or the like, and this is not limited in this application. When the uplink grant ignoring function is configured or started, it indicates that when there is no valid uplink data or there is no valid uplink data or a regular MAC CE (such as a regular BSR and/or PHR), the user terminal does not send uplink information on a resource indicated by an uplink grant. Alternatively, the second transmission rule may be sent to the user terminal by using an RRC message.

Optimized solution 4: Considering that the base station allocates an SPS resource that carries a relatively small amount of data to the user terminal, if the data to be sent by the user terminal is relatively large, the data occupies a relatively long transmission time. A design solution in this embodiment of this application is as follows:

The user terminal sends a BSR to the base station by using the first SPS resource, and the BSR carries an amount of the data to be sent by the user terminal.

The base station receives the BSR sent by the user terminal, and performs the following operation based on the BSR: allocating a physical uplink shared channel (PUSCH) resource to the user terminal; or allocating a second SPS resource to the user terminal, where an amount of data that can be carried on the second SPS resource is greater than an amount of data that can be carried on the first SPS resource.

The allocating a PUSCH resource to the user terminal is specifically: The base station notifies, by sending a first indication message to the user terminal, the user terminal of a location of a PUSCH allocated to the user terminal, to be specific, adds, to the first indication message, information about the PUSCH resource allocated to the user terminal.

Considering that the user terminal may not need to send data in a period of time after sending a relatively large data packet by using the PUSCH resource, if the first SPS resource is still scheduled, a resource waste is undoubtedly caused.

Preferably, in this embodiment of this application, the first indication message further carries SPS frozen instruction information, and the SPS frozen instruction information is used to instruct the user terminal to: after sending the data by using the PUSCH resource, suspend occupying the first SPS resource within a specified frozen time, and resume occupying the first SPS resource when the frozen time ends. The specified frozen time may alternatively be set to a quantity of frozen times, to represent a specific quantity of SPS periods.

Figure 6:
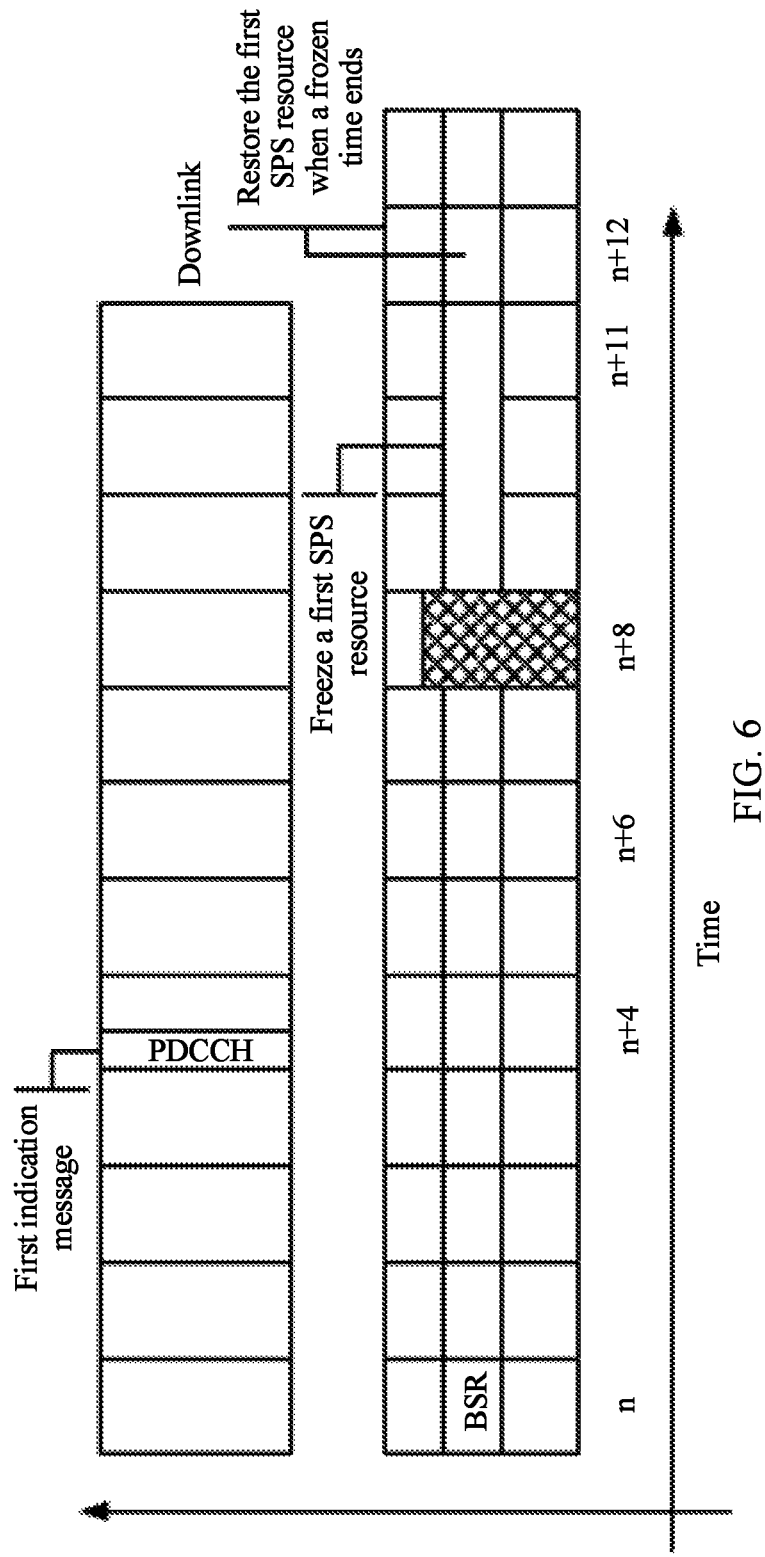
FIG. 6 is a schematic diagram 3 of an SPS scheduling process according to an embodiment of this application.

For example, as shown in FIG. 6, the user terminal sends a BSR to the base station in a subframe n, and the base station indicates, in a subframe (n+4) and on a PDCCH by using one piece of downlink control information (DCI), a PUSCH resource available to the user terminal. The user terminal sends data in a subframe (n+8) by using the PUSCH resource indicated by the base station. It is assumed that the frozen time is 3 ms. In this case, the user terminal suspends occupation of the first SPS resource in a subframe (n+9) to a subframe (n+11), and resumes occupation of the first SPS resource in a subframe (n+12).

The allocating a second SPS resource to the user terminal is specifically: The base station re-activates an SPS resource, in other words, the base station sends an activation message to the user terminal, and adds, to the activation message, the second SPS resource allocated to the user terminal.

Preferably, the base station determines, based on an amount, in the BSR, of data to be sent by the user terminal, duration of the second SPS resource scheduled for the user terminal, and adds an effective time to the activation message based on the duration. The activation message is used to notify the user terminal that the user terminal is allowed to send data within the effective time by using the second SPS resource, and is used to instruct the user terminal to: when the effective time ends, stop occupying the second SPS resource, and resume occupying the first SPS resource. Optionally, the base station may alternatively send a release command to the user terminal by using a PDCCH, and the release command is used to release the second SPS resource and resume occupying the first SPS resource.

Figure 7:
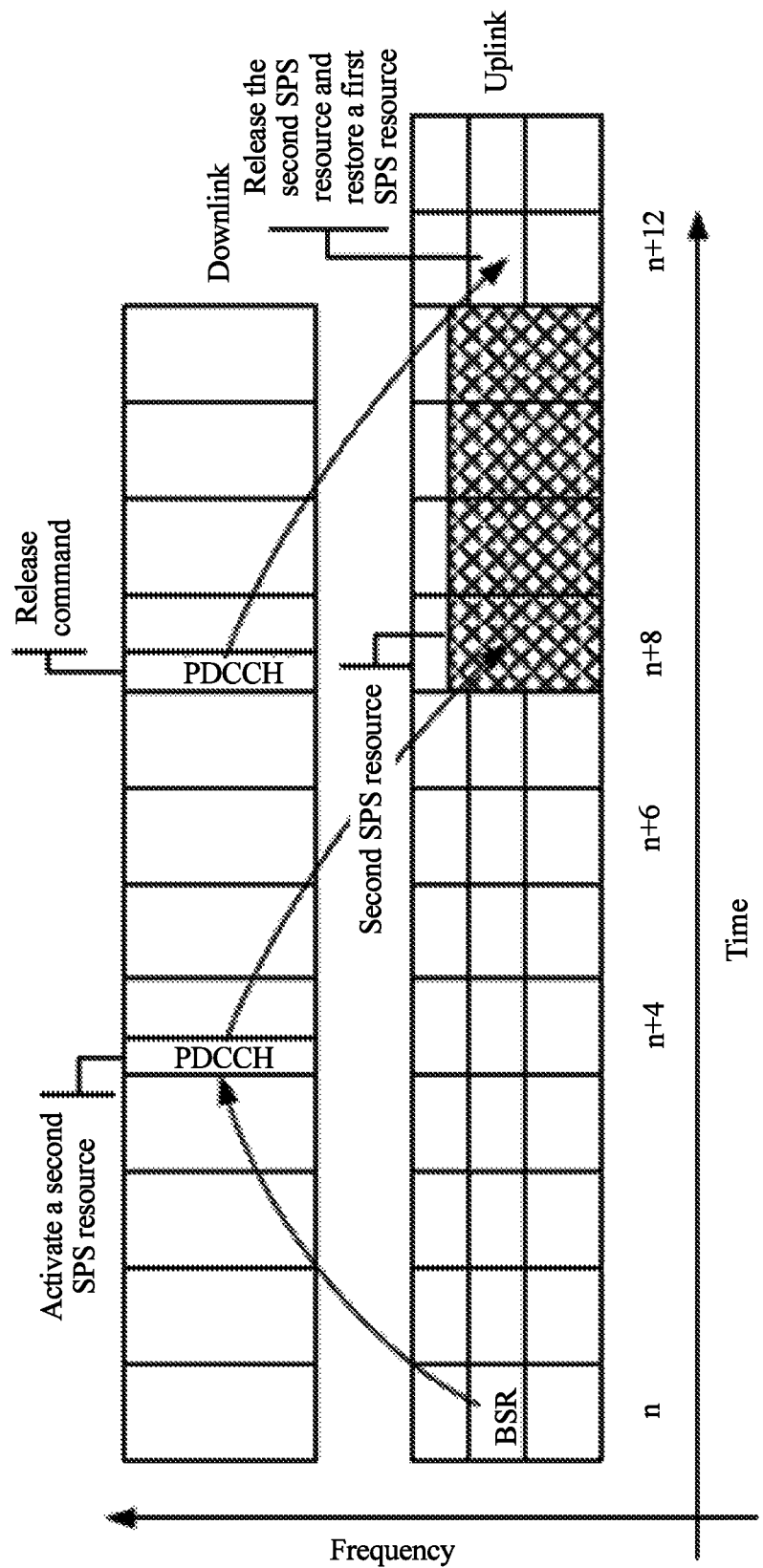
FIG. 7 is a schematic diagram 4 of an SPS scheduling process according to an embodiment of this application.

For example, as shown in FIG. 7, the user terminal sends a BSR to the base station in a subframe n, and the base station allocates the second SPS resource to the user terminal by using a PDCCH. It is assumed that an effective time is 4 ms, and the user terminal occupies the second SPS resource in a subframe (n+8) to a subframe (n+11). The base station sends a release command in advance by using the PDCCH, and based on the release command, the user terminal stops occupying the second SPS resource in a subframe (n+12), and resumes occupation of the first SPS resource.

In this way, according to the foregoing optimized solution 4, when the amount of the data to be transmitted by the user terminal is relatively large, the PUSCH resource is independently scheduled, and a time setting mechanism is used, so that after the user terminal sends the to-be-transmitted data, a small first SPS resource allocated to the user terminal is released in a period of time; or when the amount of the data to be transmitted by the user terminal is relatively large, a large second SPS resource is re-activated, and a time setting mechanism is used, so that after sending the to-be-transmitted data, the user terminal releases the large second SPS resource in a timely manner, and restores a previous small first SPS resource. In this way, data that is of a relatively large data amount and that is to be transmitted by the user terminal can be scheduled quickly, and a system resource waste and control overheads can be reduced.

Optimized solution 5: When determining that the first SPS resource does not need to be occupied, the user terminal sends a second indication message to the base station, where the second indication message is used to instruct the base station to release the first SPS resource, or the second indication message is used to instruct the base station to release the first SPS resource within a predetermined time period, and re-schedule the first SPS resource for the user terminal after the predetermined time period ends.

The base station receives the second indication message sent by the user terminal; and if the second indication message is used to indicate that the user terminal no longer needs to occupy the first SPS resource, the base station releases the first SPS resource; or if the second indication message is used to indicate that the user terminal does not need to occupy the first SPS resource within the predetermined time period, the base station releases the first SPS resource within the predetermined time period, and re-schedules the first SPS resource for the user terminal when the predetermined time period ends.

Specifically, a manner in which the user terminal sends the second indication message to the base station may be: sending a pilot signal to the base station, and using a cyclic shift value in the pilot signal to represent the second indication message; or may be: sending the second indication message to the base station by using a MAC CE.

For example, when determining that the first SPS resource does not need to be occupied, the user terminal sends a DMRS pilot on a pilot symbol, and uses a predefined cyclic shift value to represent the second indication message. The second indication message is used to indicate that the user terminal no longer needs to occupy the first SPS resource. For example, a cyclic shift value 3 indicates that the first SPS resource no longer needs to be occupied. Preferably, the second indication message may further instruct the base station to temporarily release the first SPS resource. After receiving a DMRS pilot signal, the base station temporarily releases the first SPS resource based on a cyclic shift value, and may use the first SPS resource for another purpose. For another example, when the user terminal desires to re-occupy the first SPS resource, a cyclic shift value 5 is used to indicate that the user terminal desires to continue occupying the first SPS resource. After receiving a DMRS pilot signal, the base station resumes, based on a cyclic shift value, occupation of the first SPS resource by the user terminal.

For another example, when determining that the first SPS resource does not need to be occupied, the user terminal sends a DMRS pilot on a pilot symbol, and uses a predefined cyclic shift value to represent the second indication message. The second indication message is used to indicate that the user terminal does not need to occupy the first SPS resource within a predetermined time period. For example, a start time point of the predetermined time period may be a current subframe or any predefined subframe, and duration may be set in any calculation manner related to the cyclic shift value. For example, the duration is a product of the cyclic shift value and T, and T is any preset value or is indicated by using an RRC message. After receiving a message reported by the user terminal, the base station releases the first SPS resource within the predetermined time period, and uses the first SPS resource for another purpose. When the predetermined time period ends, the base station resumes occupation of the first SPS resource by the user terminal.

For another example, when determining that the first SPS resource does not need to be occupied, the user terminal reports, to the base station by using a MAC CE, that the first SPS resource no longer needs to be occupied, and in this case, the base station releases the first SPS resource.

For another example, when determining that the first SPS resource does not need to be occupied, the user terminal reports, to the base station by using a MAC CE, that the first SPS resource does not need to be occupied within the predetermined time period. A start time point of the predetermined time period may be a current subframe or any predefined subframe, and duration is carried in a message reported by the user terminal to the base station. After receiving a message reported by the user terminal, the base station releases the first SPS resource within the predetermined time period, and uses the first SPS resource for another purpose. When the predetermined time period ends, the base station resumes occupation of the first SPS resource by the user terminal.

In this way, in a user terminal—assisted scheduling manner, when the user terminal has no data to be sent, an SPS resource occupied by the user terminal can be released in a timely manner, and the released SPS resource is used for another purpose, so that resource utilization is improved, and a system resource waste is avoided.

Optimized solution 6: Considering that the user terminal needs to send a padding data packet when the user terminal has no data to be sent, the user terminal does not need to send data in each SPS period, especially for the short-period SPS application scenario in this embodiment of this application. Therefore, a quantity of times of sending the padding data packet needs to be increased, and this wastes both power of the user terminal and system resources. In the optimized solution 6, before the user terminal sends data, a second transmission rule is determined. The second transmission rule includes: (1) The user terminal does not send a padding data packet in a subframe in which neither a service data unit (SDU) at a MAC layer nor a specific MAC CE is sent, in other words, ignores an uplink grant, where the specific MAC CE includes one or more of a regular BSR, a periodic BSR, and a periodic PHR. When (1) is enabled, the user terminal does not send a periodic BSR and/or a periodic PHR when the user terminal does not need to send an SDU at the MAC layer (MAC SDU). According to the second transmission rule indicated by the base station, the user terminal does not send the padding data packet when no MAC SDU or specific MAC CE is to be sent, in other words, ignores an uplink grant. In this case, the periodic BSR and/or the periodic PHR need/needs to be sent together with the MAC SDU. In other words, the periodic BSR and/or the periodic PHR can be sent only when the MAC SDU is sent.

The second transmission rule may be stipulated in a protocol, or the second transmission rule may be sent to the user terminal by using an RRC message. This is not limited in this application.

According to the foregoing optimized solution 6, power of the user terminal power can be saved, and a system resource waste is avoided.

Optimized solution 7: Considering that uplink synchronization is lost when duration in which the terminal does not send any data exceeds that of a time alignment timer (TA Timer), in this embodiment of this application, the user terminal starts a timer when stopping sending any data by using the first SPS resource, and when the timer expires, the user terminal sends data to the base station if it is determined that the user terminal sends no data to the base station within a timing time of the timer. The timing time of the timer is less than that of the TA timer.

Specifically, when the timer expires, the user terminal sends any data by using the first SPS resource. For example, the user terminal may send a padding data packet, to ensure uplink synchronization of the user terminal.

Optimized solution 8: Considering that there are different uplink-downlink subframe configurations in a time division duplex (TDD) LTE system, and an uplink-downlink transition point period is usually 5 or 10 ms, a subframe with an SPS configuration may not be an available uplink subframe, especially for a short-period SPS scheduling scenario in this embodiment of this application. In this embodiment of the present invention:

In a time division duplex TDD system, before receiving the data sent by the user terminal, the base station determines an SPS occupation subframe according to a third transmission rule, and the SPS occupation subframe is a subframe occupied when the user terminal sends data based on the SPS period.

The third transmission rule includes one of the following three types: 1. The SPS occupation subframe is determined based on the SPS period in a time occupied by all types of subframes (including a downlink subframe, an uplink subframe, and a special subframe), where if the SPS occupation subframe determined in any SPS period is an uplink subframe, data can be sent by using the uplink subframe, and if the SPS occupation subframe determined in any SPS period is a non-uplink subframe, namely, a downlink subframe or a special subframe, occupying the non-uplink subframe is abandoned. 2. The SPS occupation subframe is determined based on the SPS period within a time occupied by all uplink subframes, and the subframe can be occupied for sending data. 3. The SPS occupation subframe is determined based on the SPS period within a time occupied by all types of subframes, and data can be sent by using the SPS occupation subframe, where in a process of determining the SPS occupation subframe, if the determined SPS occupation subframe is a non-uplink subframe, a first uplink subframe after the non-uplink subframe is determined as the SPS occupation subframe. Subsequently, the first uplink subframe may be used as a start point to calculate a subsequent SPS occupation subframe, or the SPS occupation subframe is still calculated based on an original period.

The third transmission rule may be stipulated in a protocol, or the third transmission rule may be sent to the user terminal by using an RRC message. This is not limited in the present invention.

An SPS period of 2 ms and a TDD subframe configuration 0 are used as an example below, and the first, second, and third cases in the foregoing rules are described with reference to the accompanying drawings.

Figure 8:
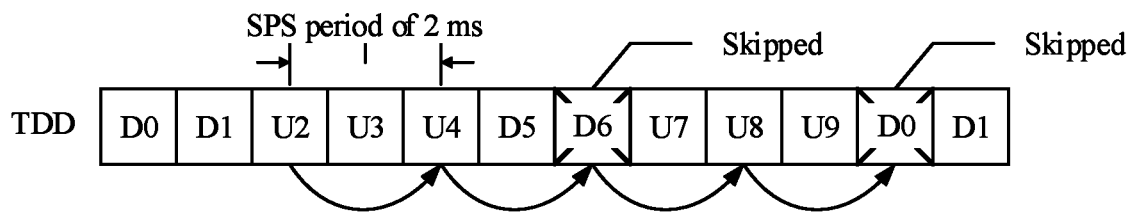
FIG. 8 to FIG. 10 are schematic diagrams of a method for configuring an SPS period in a TDD system according to an embodiment of this application.

The first case is shown in FIG. 8. D0, D1, D5, and D6 are downlink subframes, and U2, U3, U4, U7, U8, and U9 are uplink subframes. The user terminal selects a to-be-used subframe based on the SPS period of 2 ms in a time occupied by all types of subframes. When the selected to-be-used subframe is an unavailable subframe (including a downlink subframe and a special subframe), the selected to-be-used subframe is abandoned and a to-be-used subframe in a next SPS period is selected. As shown in FIG. 8, the subframes D6 and D0 are downlink subframes, and are abandoned.

Figure 9:
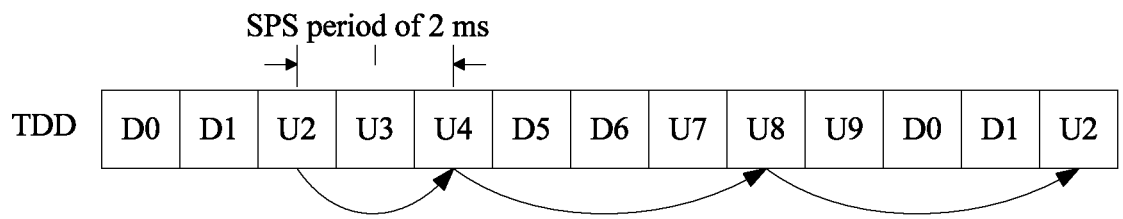

The second case is shown in FIG. 9. D0, D1, D5, and D6 are downlink subframes, and U2, U3, U4, U7, U8, and U9 are uplink subframes. The user terminal sends data based on the SPS period of 2 ms only in a time occupied by an uplink subframe, so that a case in which a to-be-used subframe is an unavailable subframe does not occur.

Figure 10:
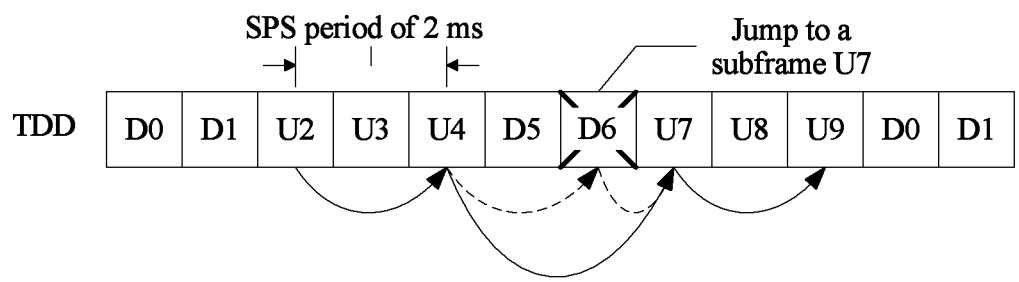

The third case is shown in FIG. 10. D0, D1, D5, and D6 are downlink subframes, and U2, U3, U4, U7, U8, and U9 are uplink subframes. The user terminal still selects a to-be-used subframe based on the SPS period of 2 ms in a time occupied by all types of subframes. When the selected subframe is an unavailable subframe, the user terminal does not select the unavailable subframe but jumps to a next available subframe, and selects the next available subframe as a to-be-used subframe. For example, when D6 is an unavailable subframe, D6 is not selected but U7 is selected as the to-be-used subframe. If U7 is used as a start point of subsequent SPS subframes, a next SPS subframe calculated based on the period of 2 ms is U9, as shown in FIG. 10. Optionally, an SPS subframe may still be calculated based on the original period, and in this case, a next SPS subframe is U8.

In the foregoing optimized solution 8, a problem that in the TDD system, a subframe with an SPS configuration is not an available uplink subframe in the short-period SPS scheduling scenario is resolved.

Optimized solution 9: On the basis of the optimized solution 6, when the user terminal has no data to be sent, sending of an uplink sounding reference signal (SRS) and/or a periodic physical uplink control channel (PUCCH) signal wastes power of the user terminal and causes uplink interference.

In the optimized solution 9, the base station determines a fourth transmission rule, and indicates the fourth transmission rule to the user terminal.

The fourth transmission rule includes: when determining that data is sent without a need to occupy the first SPS resource, configuring or starting, by the user terminal, to ignore an uplink grant; and when configuring or starting to ignore the uplink grant, skipping sending a periodic SRS and a periodic PUCCH; or after configuring or starting to ignore the uplink grant, when a quantity of times that the uplink grant is ignored reaches a first threshold or a time in which the uplink grant is ignored reaches a second threshold, skip sending a periodic SRS and a periodic PUCCH.

The user terminal determines the fourth transmission rule indicated by the base station, and transmits data according to the fourth transmission rule. When the uplink grant is configured or started, the periodic SRS and the periodic PUCCH are not sent; or when the uplink grant is ignored and the quantity of times that the uplink grant is ignored reaches a threshold N, the periodic SRS and the periodic PUCCH are not sent, where the threshold N is a natural number such as 1, 2, or 3; or when the uplink grant is ignored and the time in which the uplink grant is ignored reaches a threshold K, the periodic SRS and the periodic PUCCH are not sent, where the threshold K is greater than or equal to 0.

The fourth transmission rule may be stipulated in a protocol, or the fourth transmission rule may be sent to the user terminal by using an RRC message. This is not limited in the present invention.

According to the foregoing optimized solution 9, power of the user terminal can be saved, and uplink interference is reduced.

It should be noted that the method shown in FIG. 2 in this embodiment of this application, and the optimized solution 1 to the optimized solution 9 may be used in any combination.

Figure 11:
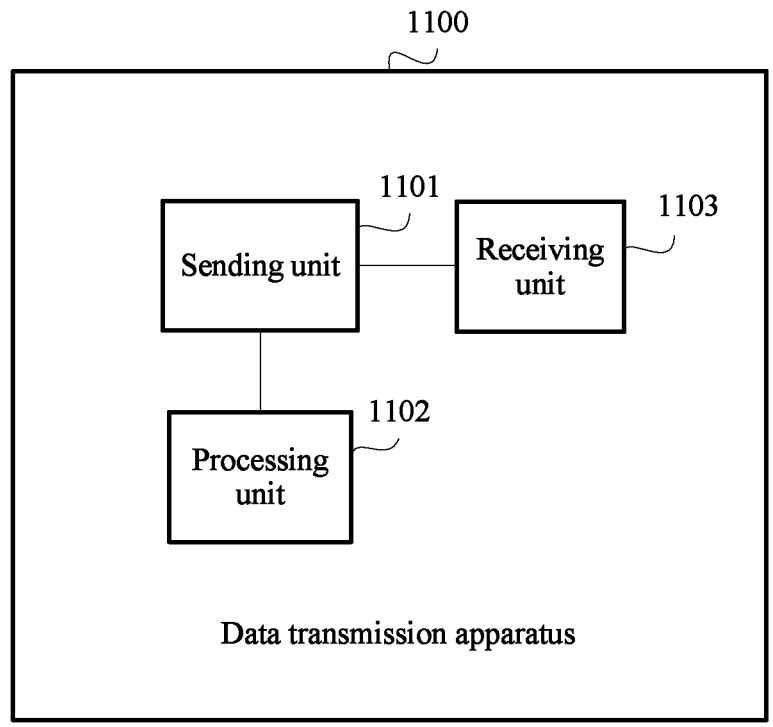
FIG. 11 shows a data transmission apparatus 1 according to an embodiment of this application.

Based on a same invention concept, referring to FIG. 11, an embodiment of this application further provides a data transmission apparatus 1100, and the data transmission apparatus 1100 includes a sending unit 1101, a processing unit 1102, and a receiving unit 1103.

The sending unit 1101 is configured to notify a user terminal of a semi-persistent scheduling SPS period, where the SPS period is a short period.

The processing unit 1102 is configured to allocate a first SPS resource to the user terminal.

The receiving unit 1103 is configured to receive data periodically sent by the user terminal, where the data is sent based on the SPS period notified by the sending unit 1101, and is sent by using the first SPS resource allocated by the processing unit 1102.

Preferably, the short period is used to indicate that a quantity of subframes included in the SPS period is less than 10.

Preferably, the processing unit 1102 is further adapted to configure an activation length parameter for the user terminal, where the activation length parameter is used to indicate a quantity of consecutive available subframes in one SPS period.

Preferably, the receiving unit 1103 is configured to:
receive initially transmitted data and at least one piece of retransmitted data for the initially transmitted data that are sent by the user terminal, where the initially transmitted data and the at least one piece of retransmitted data occupy the first SPS resource in consecutive SPS periods.

Preferably, the at least one piece of retransmitted data and the initially transmitted data include same content; or
the at least one piece of retransmitted data and the initially transmitted data carry different incremental redundancy information.

Preferably, the receiving unit 1103 is further configured to:
receive a quantity of continuous transmission times that is sent by the user terminal, where the quantity of continuous transmission times indicates a total quantity of times that the initially transmitted data and the retransmitted data are transmitted.

Preferably, the sending unit 1101 is further configured to:
indicate a first transmission rule to the user terminal, where the first transmission rule includes: when the retransmitted data and the initially transmitted data conflict with each other on the first SPS resource, preferentially sending the retransmitted data.

Preferably, the processing unit 1102 is further configured to:
if the receiving unit 1103 receives a buffer status report BSR sent by the user terminal,
allocate a physical uplink shared channel PUSCH resource to the user terminal; or
allocate a second SPS resource to the user terminal, where an amount of data that can be carried on the second SPS resource is greater than an amount of data that can be carried on the first SPS resource.

Preferably, the processing unit 1102 is configured to:
send a first indication message to the user terminal, where the first indication message carries information about the PUSCH resource allocated to the user terminal.

The first indication message further carries SPS frozen instruction information, and the SPS frozen instruction information is used to instruct the user terminal to: after sending the data by using the PUSCH resource, suspend occupying the first SPS resource within a specified frozen time, and resume occupying the first SPS resource when the frozen time ends.

Preferably, the processing unit 1102 is configured to:
send an activation message to the user terminal, where the activation message carries the second SPS resource allocated to the user terminal.

the activation message further carries an effective time, and the activation message is used to notify the user terminal that the user terminal is allowed to send data within the effective time by using the second SPS resource, and is used to instruct the user terminal to: when the effective time ends, stop occupying the second SPS resource, and resume occupying the first SPS resource.

Preferably, the processing unit 1102 is further configured to:
after it is determined that the user terminal sends all the to-be-sent data, send an SPS resource release command to the user terminal, where the SPS resource release command is used to instruct the user terminal to stop occupying the second SPS resource and resume occupying the first SPS resource.

Preferably, the receiving unit 1103 is further configured to receive a second indication message sent by the user terminal.

The processing unit 1102 is further configured to:
if the second indication message received by the receiving unit 1103 is used to indicate that the user terminal no longer needs to occupy the first SPS resource, release the first SPS resource; or
if the second indication message received by the receiving unit 1103 is used to indicate that the user terminal does not need to occupy the first SPS resource within a predetermined time period, release the first SPS resource within the predetermined time period, and re-schedule the first SPS resource for the user terminal when the predetermined time period ends.

Preferably, the receiving unit 1103 is configured to:
detect a pilot signal sent by the user terminal, and obtain the second indication message by using a cyclic shift value in the pilot signal; or
receive, by using a control element CE at a Media Access Control MAC layer, the second indication message sent by the user terminal.

Preferably, in a time division duplex TDD system, the processing unit 1102 is further configured to:
determine an SPS occupation subframe according to a third transmission rule.

The third transmission rule includes:

determining, based on the SPS period, the SPS occupation subframe within a time occupied by all types of subframes, where if the determined SPS occupation subframe is an uplink subframe, data can be sent by using the uplink subframe, or if the SPS occupation subframe determined in any SPS period is a non-uplink subframe, namely, a downlink subframe or a special subframe, occupying the non-uplink subframe is abandoned; or determining, based on the SPS period, the SPS occupation subframe within a time occupied by all uplink subframes, and sending data by using the subframes; or determining, based on the SPS period, the SPS occupation subframe within a time occupied by all types of subframes, and sending data by using the SPS occupation subframe, where in a process of determining the SPS occupation subframe, if the determined SPS occupation subframe is a non-uplink subframe, a first uplink subframe after the non-uplink subframe is determined as the SPS occupation subframe.

Preferably, the processing unit 1102 is further configured to:

indicate a second transmission rule to the user terminal, where the second transmission rule includes: skipping sending, by the user terminal, a padding data packet in a subframe in which neither a service data unit SDU at the MAC layer nor a specific CE at the MAC layer is sent, where the specific CE at the MAC layer includes one or more of a regular BSR, a periodic BSR, and a periodic power headroom report PHR; and when no SDU at the MAC layer needs to be sent, skip sending the periodic BSR and/or the periodic PHR.

Preferably, the processing unit 1102 is further configured to:

determine a fourth transmission rule, and indicate the fourth transmission rule to the user terminal.

The fourth transmission rule includes: when determining that data is sent without a need to occupy the first SPS resource, configuring or starting, by the user terminal, to ignore an uplink grant; and when configuring or starting to ignore the uplink grant, skipping sending a periodic sounding reference signal SRS and a periodic physical uplink control channel PUCCH; or after configuring or starting to ignore the uplink grant, when a quantity of times that the uplink grant is ignored reaches a first threshold or a time in which the uplink grant is ignored reaches a second threshold, skipping sending a periodic SRS and a periodic PUCCH.

Figure 12:
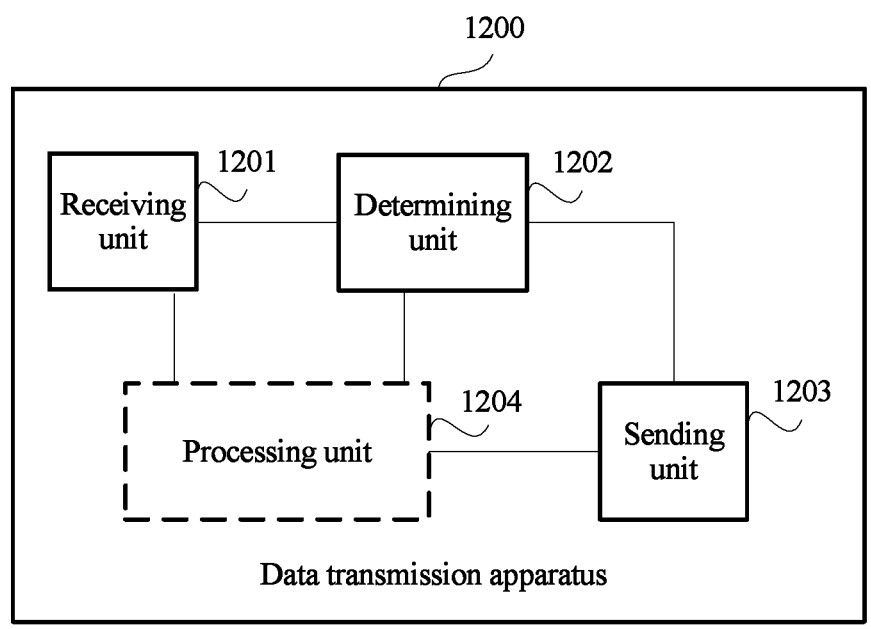
FIG. 12 shows a data transmission apparatus 2 according to an embodiment of this application.

Based on a same invention concept, referring to FIG. 12, an embodiment of this application further provides another data transmission apparatus 1200, and the data transmission apparatus 1200 includes a receiving unit 1201, a determining unit 1202, and a sending unit 1203.

The receiving unit 1201 is configured to receive an SPS period configured by a base station, where the SPS period is a short period.

The determining unit 1202 is configured to determine a first SPS resource allocated by the base station.

The sending unit 1203 is configured to periodically send data to the base station, where the base station is sent based on the SPS period received by the receiving unit 1201, and is sent by using the first SPS resource determined by the determining unit 1202.

Preferably, the short period is used to indicate that a quantity of subframes included in the SPS period is less than 10.

Preferably, the receiving unit 1201 is further configured to:

receive an activation length parameter configured by the base station, where the activation length parameter is used to indicate a quantity of consecutive available subframes in one SPS period.

The sending unit 1203 is further configured to:

send, in the SPS period, the data based on the activation length parameter by using consecutive available subframes.

Preferably, the sending unit 1203 is configured to:

send initially transmitted data and at least one piece of retransmitted data for the initially transmitted data to the base station by using the first SPS resource in consecutive SPS periods.

Preferably, the at least one piece of retransmitted data and the initially transmitted data include same content; or the at least one piece of retransmitted data and the initially transmitted data carry different incremental redundancy information.

Preferably, the sending unit 1203 is further configured to send a quantity of continuous transmission times to the base station, where the quantity of continuous transmission times indicates a quantity of times that the initially transmitted data and the retransmitted data are transmitted.

Preferably, the sending unit 1203 is configured to:

send a pilot signal to the base station, where a cyclic shift value in the pilot signal is used to indicate the quantity of continuous transmission times; or send the quantity of continuous transmission times to the base station by using a control element CE at a Media Access Control MAC layer.

Preferably, the receiving unit 1201 is further configured to:

receive a first transmission rule sent by the base station.

The sending unit 1203 is further configured to: in a process of sending the data to the base station, when the retransmitted data and the initially transmitted data conflict with each other on the first SPS resource according to the first transmission rule received by the receiving unit, preferentially send the retransmitted data.

Preferably, the sending unit 1203 is further configured to send a buffer status report BSR to the base station, where the BSR carries an amount of data to be sent by the user terminal.

The receiving unit 1201 is further configured to: after the sending unit 1203 sends the BSR, receive a first indication message sent by the base station; or after the sending unit 1203 sends the BSR, receive an activation message sent by the base station.

The determining unit 1202 is further configured to: determine, based on the first indication message received by the receiving unit 1201, information about a physical uplink shared channel PUSCH resource allocated by the base station; or determine, based on the activation message received by the receiving unit 1201, a second SPS resource allocated by the base station, where an amount of data that can be carried on the second SPS resource is greater than an amount of data that can be carried on the first SPS resource.

Preferably, the first indication message further carries the SPS frozen instruction information, and the determining unit 1202 is further configured to determine a specified frozen time based on the SPS frozen instruction information.

The data transmission apparatus 1200 further includes a processing unit 1204.

The processing unit 1204 is configured to: after the data is sent by using the PUSCH resource based on the SPS frozen instruction information determined by the determining unit 1202, suspend occupying the first SPS resource within the frozen time, and resume occupying the first SPS resource when the frozen time ends.

Preferably, the activation message further carries an effective time, and the processing unit 1204 is further configured to: send, based on the activation message, the data within the effective time by using the second SPS resource, and when the effective time ends, stop occupying the second SPS resource, and resume occupying the first SPS resource.

Preferably, the sending unit 1203 is further configured to send the data by using the second SPS resource.

The receiving unit 1201 is further configured to: after the to-be-sent data is sent, receive an SPS resource release command sent by the base station.

The processing unit 1204 is further configured to: stop, based on the SPS resource release command, occupying the second SPS resource, and resume occupying the first SPS resource.

Preferably, the sending unit 1203 is further configured to send a second indication message to the base station when it is determined that the first SPS resource does not need to be occupied.

The second indication message is used to instruct the base station to release the first SPS resource, or the second indication message is used to instruct the base station to release the first SPS resource in a predetermined time period, and re-schedule the first SPS resource for the user terminal after the predetermined time period ends.

Preferably, the sending unit 1203 is further configured to:

send a pilot signal to the base station, and use a cyclic shift value in the pilot signal to represent the second indication message; or send the second indication message to the base station by using a control element CE at a Media Access Control MAC layer.

Preferably, the receiving unit 1201 is further configured to receive a second transmission rule sent by the base station The sending unit 1203 is further configured to: skip sending, based on the second transmission rule, a padding data packet in a subframe in which neither a service data unit SDU at the MAC layer nor a specific CE at the MAC layer is sent, and skip sending a periodic BSR and/or a periodic power headroom report PHR when no SDU at the MAC layer needs to be sent, where the specific CE at the MAC layer includes one or more of a regular BSR, a periodic BSR, and a periodic PHR.

Preferably, the processing unit 1204 is further configured to: start a timer when the user terminal stops sending any data by using the first SPS resource; and when the timer expires, if it is determined that no data is sent to the base station within a timing time of the timer, send the data to the base station by using the sending unit.

The timing time of the timer is less than that of a time alignment TA timer.

Preferably, in a time division duplex TDD system, the receiving unit 1201 is further configured to: before the sending unit 1203 sends data to the base station, receive a third transmission rule sent by the base station, where the third transmission rule is used to determine an SPS occupation subframe, and the SPS occupation subframe is a subframe occupied when the sending unit sends data based on the SPS period.

The sending unit 1203 is further configured to:

determine, based on the SPS period, the SPS occupation subframe within a time occupied by all types of subframes, where if the determined SPS occupation subframe is an uplink subframe, data can be sent by using the uplink subframe, or if the SPS occupation subframe determined in any SPS period is a non-uplink subframe, namely, a downlink subframe or a special subframe, occupying the non-uplink subframe is abandoned; or determine, based on the SPS period, the SPS occupation subframe within a time occupied by all uplink subframes, and send data by using the subframes; or determine, based on the SPS period, the SPS occupation subframe within a time occupied by all types of subframes, and send data by using the SPS occupation subframe, where in a process of determining the SPS occupation subframe, if the determined SPS occupation subframe is a non-uplink subframe, a first uplink subframe after the non-uplink subframe is determined as the SPS occupation subframe.

Preferably, the receiving unit 1201 is further configured to: before sending the data to the base station, receive a fourth transmission rule sent by the base station.

The sending unit 1203 is further configured to: when it is determined, according to the fourth transmission rule, that the data is sent without a need to occupy the first SPS resource, configure or start to ignore an uplink grant; and when configuring or starting to ignore the uplink grant, skip sending a periodic sounding reference signal SRS and a periodic physical uplink control channel PUCCH; or after configuring or starting to ignore the uplink grant, when a quantity of times that the uplink grant is ignored reaches a first threshold or a time in which the uplink grant is ignored reaches a second threshold, skip sending a periodic SRS and a periodic PUCCH.

Figure 13:
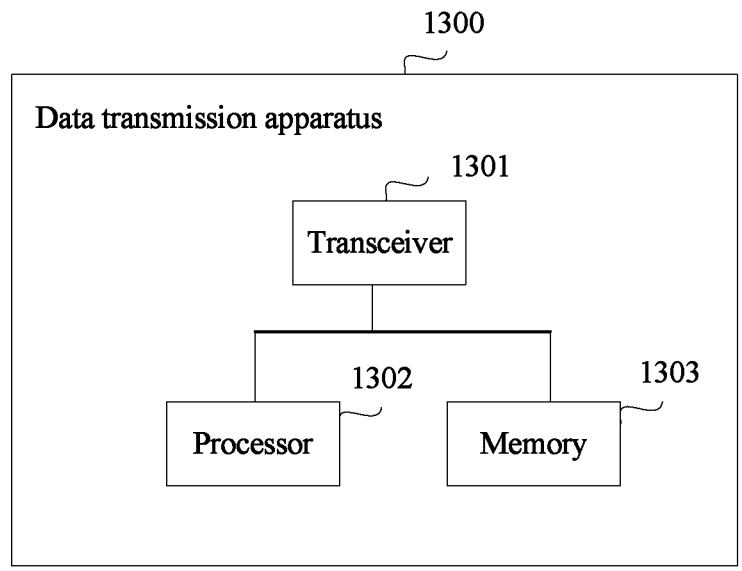
FIG. 13 shows a data transmission apparatus 3 according to an embodiment of this application.

Based on a same invention concept, referring to FIG. 13, an embodiment of this application further provides another data transmission apparatus 1300, configured to perform a function of the base station in the data transmission method according to the foregoing embodiments of this application.

The data transmission apparatus 1300 includes a transceiver 1301 and a processor 1302, and preferably, further includes a memory 1303. The memory 1303 stores a group of programs, and the processor 1302 is configured to invoke the programs stored in the memory 1303, so that the data transmission apparatus 1300 performs the data transmission method in FIG. 2 or any one or several of the optimized solution 1 to the optimized solution 9 in this application.

It should be noted that a connection manner between parts shown in FIG. 13 is merely a possible example. Alternatively, both the transceiver 1301 and the memory 1303 are connected to the processor 1302, and the transceiver 1301 and the memory 1303 are not connected, or another possible connection manner may be used.

The processor 1302 may be a central processing unit (CPU), a network processor (NP), or a combination of a CPU and an NP.

The processor 1302 may further include a hardware chip. The foregoing hardware chip may be an application-specific integrated circuit (ASIC), a programmable logic device (PLD), or a combination thereof. The foregoing PLD may be a complex programmable logic device (CPLD), a field-programmable gate array (FPGA), generic array logic (GAL), or any combination thereof.

The memory 1303 may include a volatile memory such as a random access memory (RAM). Alternatively, the memory 1303 may include a non-volatile memory such as a flash memory, a hard disk drive (HDD) or a solid state drive (SSD). Alternatively, the memory 1303 may include a combination of the foregoing types of memories.

Figure 14:
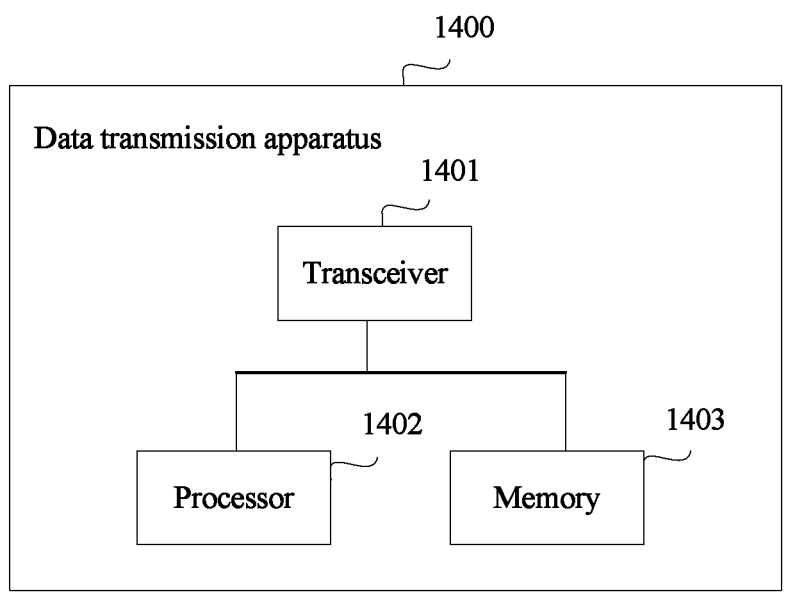
FIG. 14 shows a data transmission apparatus 4 according to an embodiment of this application.

Based on a same invention concept, referring to FIG. 14, an embodiment of this application further provides another data transmission apparatus 1400, configured to perform a function of the user terminal in the data transmission method according to the foregoing embodiments of this application. The data transmission apparatus 1400 includes a transceiver 1401 and a processor 1402, and preferably, further includes a memory 1403. The memory 1403 stores a group of programs, and the processor 1402 is configured to invoke the programs stored in the memory 1403, so that the data transmission apparatus 1400 performs the data transmission method in FIG. 2 or any one or several of the optimized solution 1 to the optimized solution 9 in this application.

It should be noted that a connection manner between parts shown in FIG. 14 is merely a possible example. Alternatively, both the transceiver 1401 and the memory 1403 are connected to the processor 1402, and the transceiver 1401 and the memory 1403 are not connected, or another possible connection manner may be used.

The processor 1402 may be a central processing unit (CPUt), a network processor (NP), or a combination of a CPU and an NP.

The processor 1402 may further include a hardware chip. The foregoing hardware chip may be an application-specific integrated circuit (ASIC), a programmable logic device (PLD), or a combination thereof. The foregoing PLD may be a complex programmable logic device (CPLD), a field-programmable gate array (FPGA), generic array logic (GAL), or any combination thereof.

The memory 1403 may include a volatile memory such as a random access memory (RAM). Alternatively, the memory 1403 may include a non-volatile memory such as a flash memory, a hard disk drive (HDD) or a solid state drive (SSD). Alternatively, the memory 1403 may include a combination of the foregoing types of memories.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program indications may be used to implement each process and/or each block in the flowcharts and/or the block diagrams and a combination of a process and/or a block in the flowcharts and/or the block diagrams. These computer program indications may be provided for a general-purpose computer, a dedicated computer, an embedded processor, or a processor of any other programmable data processing device to generate a machine, so that the indications executed by a computer or a processor of any other programmable data processing device generate an apparatus for implementing a specific function in one or more processes in the flowcharts and/or in one or more blocks in the block diagrams.

These computer program indications may be stored in a computer readable memory that can instruct the computer or any other programmable data processing device to work in a specific manner, so that the indications stored in the computer readable memory generate an artifact that includes an indication apparatus. The indication apparatus implements a specific function in one or more processes in the flowcharts and/or in one or more blocks in the block diagrams.

These computer program indications may be loaded onto a computer or another programmable data processing device, so that a series of operations and steps are performed on the computer or the another programmable device, thereby generating computer-implemented processing. Therefore, the indications executed on the computer or the another programmable device provide steps for implementing a specific function in one or more processes in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to the embodiments of this application without departing from the spirit and scope of the embodiments of the present invention. This application is intended to cover these modifications and variations provided that they fall within the scope of protection defined by the following claims and their equivalent technologies.

What is claimed is:

1. A data transmission method, comprising:
   notifying, by a base station, a user terminal of a semi-persistent scheduling (SPS) period, wherein the SPS period is a short period;
   allocating, by the base station, a first SPS resource to the user terminal;
   transmitting, by the base station, an activation length parameter to the user terminal, wherein the activation length parameter indicates a quantity of consecutive available subframes in one SPS period; and
   receiving, by the base station, data periodically sent by the user terminal, wherein the data is sent based on the SPS period using the first SPS resource, and wherein receiving the data periodically sent by the user terminal comprises:
      receiving, by the base station, initially transmitted data and at least one piece of retransmitted data for the initially transmitted data that are sent by the user terminal, wherein the initially transmitted data and the at least one piece of retransmitted data occupy the first SPS resource in consecutive SPS periods, and wherein receiving the initially transmitted data and the at least one piece of retransmitted data comprises:
         receiving, by the base station, a quantity of continuous transmission times that is sent by the user terminal, wherein the quantity of continuous transmission times indicates a total quantity of times that the initially transmitted data and the retransmitted data are transmitted.

2. The method according to claim 1, further comprising:
   configuring, by the base station, the activation length parameter for the user terminal.

3. The method according to claim 1, wherein:
   the at least one piece of retransmitted data and the initially transmitted data comprise same content; or
   the at least one piece of retransmitted data and the initially transmitted data carry different incremental redundancy information.

4. A network device, comprising:
at least one processor; and
a non-transitory memory, wherein the memory stores one or more execution instruction, and wherein the instructions instruct the at least one processor to:
notify a user terminal of a semi-persistent scheduling (SPS) period, wherein the SPS period is a short period;
allocate a first SPS resource to the user terminal;
transmit an activation length parameter to the user terminal, wherein the activation length parameter indicates a quantity of consecutive available subframes in one SPS period; and
receive data periodically sent by the user terminal, wherein the data is sent based on the SPS period using the first SPS resource, and wherein receiving the data periodically sent by the user terminal comprises:
receiving initially transmitted data and at least one piece of retransmitted data for the initially transmitted data that are sent by the user terminal, wherein the initially transmitted data and the at least one piece of retransmitted data occupy the first SPS resource in consecutive SPS periods, and wherein receiving the initially transmitted data and the at least one piece of retransmitted data comprises:
receiving a quantity of continuous transmission times that is sent by the user terminal, wherein the quantity of continuous transmission times indicates a total quantity of times that the initially transmitted data and the retransmitted data are transmitted.

5. The network device according to claim 4, the instructions further instruct the at least one processor to:
configure the activation length parameter for the user terminal.

6. The network device according to claim 4, wherein:
the at least one piece of retransmitted data and the initially transmitted data comprise same content; or
the at least one piece of retransmitted data and the initially transmitted data carry different incremental redundancy information.

7. The network device according to claim 4, wherein before the receiving data periodically sent by the user terminal, the instructions further instruct the at least one processor to:
indicate a first transmission rule to the user terminal, wherein the first transmission rule comprises, when the retransmitted data and the initially transmitted data conflict with each other on the first SPS resource, preferentially sending the retransmitted data.

8. The network device according to claim 4, wherein after the allocating a first SPS resource to the user terminal, the instructions further instruct the at least one processor to:
if a buffer status report (BSR) sent by the user terminal is received, performing the following operation based on the BSR:
allocating a physical uplink shared channel (PUSCH) resource to the user terminal; or
allocating a second SPS resource to the user terminal, wherein an amount of data that can be carried on the second SPS resource is greater than an amount of data that can be carried on the first SPS resource.

9. A device, comprising:
at least one processor; and
a non-transitory memory, wherein the memory stores one or more execution instruction, and wherein the instructions instruct the at least one processor to:
receive a semi-persistent scheduling (SPS) period configured by a base station, wherein the SPS period is a short period;
receive an activation length parameter configured by the base station, wherein the activation length parameter indicates a quantity of consecutive available subframes in one SPS period;
determine a first SPS resource allocated by the base station; and
periodically send data to the base station, wherein the data is sent based on the SPS period using the first SPS resource, and wherein sending the data to the base station comprises:
sending initially transmitted data and at least one piece of retransmitted data for the initially transmitted data to the base station using the first SPS resource in consecutive SPS periods, wherein in a process of sending the initially transmitted data and the at least one piece of retransmitted data for the initially transmitted data to the base station using the consecutive SPS periods, the device sends a quantity of continuous transmission times to the base station, and wherein the quantity of continuous transmission times indicates a quantity of times that the initially transmitted data and the retransmitted data are transmitted.

10. The device according to claim 9, wherein the sending data to the base station comprises:
sending in the SPS period, the data based on the activation length parameter using consecutive available subframes.

11. The device according to claim 9, wherein:
the at least one piece of retransmitted data and the initially transmitted data comprise same content; or
the at least one piece of retransmitted data and the initially transmitted data carry different incremental redundancy information.

12. The device according to claim 9, wherein the sending a quantity of continuous transmission times to the base station comprises:
sending a pilot signal to the base station, wherein a cyclic shift value in the pilot signal indicates the quantity of continuous transmission times; or
sending the quantity of continuous transmission times to the base station using a control element CE at a Media Access Control (MAC) layer.

13. The device according to claim 9, wherein the instructions further instruct the at least one processor to:
receive a first transmission rule sent by the base station; and
in a process of sending the data to the base station, when the retransmitted data and the initially transmitted data conflict with each other on the first SPS resource according to the first transmission rule, preferentially send the retransmitted data.

14. The device according to claim 9, wherein the instructions further instruct the at least one processor to:
send a buffer status report (BSR) to the base station, wherein the BSR carries an amount of data to be sent; and after sending the BSR:
- receive a first indication message sent by the base station, and determining, based on the first indication message, information about a physical uplink shared channel (PUSCH) resource allocated by the base station; or
- receive an activation message sent by the base station, and determining, based on the activation message, a second SPS resource allocated by the base station, wherein an amount of data that can be carried on the second SPS resource is greater than an amount of data that can be carried on the first SPS resource.

* * * * *